US010558971B2

(12) United States Patent
Fontaine et al.

(10) Patent No.: US 10,558,971 B2
(45) Date of Patent: *Feb. 11, 2020

(54) METHOD, DEVICE AND SECURE ELEMENT FOR CONDUCTING A SECURED FINANCIAL TRANSACTION ON A DEVICE

(71) Applicant: MOBEEWAVE INC., Montreal (CA)

(72) Inventors: Sebastien Fontaine, Montreal (CA); Luc Dolcino, Laval (CA); Benjamin Du Hays, Hampstead (CA); Maxime De Nanclas, Montreal (CA); Xavier Alberti, Montreal (CA)

(73) Assignee: MOBEEWAVE, INC., Montreal (CA)

( * ) Notice: Subject to any disclaimer, the term of this patent is extended or adjusted under 35 U.S.C. 154(b) by 17 days.

This patent is subject to a terminal disclaimer.

(21) Appl. No.: 15/861,963

(22) Filed: Jan. 4, 2018

(65) Prior Publication Data

US 2018/0144334 A1 May 24, 2018

Related U.S. Application Data

(63) Continuation of application No. 14/371,828, filed as application No. PCT/CA2013/000185 on Feb. 28, 2013, now Pat. No. 9,892,403.

(Continued)

(51) Int. Cl.
*G06Q 40/00* (2012.01)
*G06Q 20/32* (2012.01)
(Continued)

(52) U.S. Cl.
CPC ......... *G06Q 20/3227* (2013.01); *G06Q 20/20* (2013.01); *G06Q 20/32* (2013.01);
(Continued)

(58) Field of Classification Search
USPC ..................................................... 705/35–44
See application file for complete search history.

(56) References Cited

U.S. PATENT DOCUMENTS 5,892,900 A 4/1999 Ginter et al.
5,933,812 A 8/1999 Meyer et al.
(Continued)

FOREIGN PATENT DOCUMENTS

CN 101950453 A 1/2011
CN 101976402 A 2/2011
(Continued)

OTHER PUBLICATIONS

GlobalPlatform, "Mobile Task Force: Requirement for NFC Mobile: Management of Mulitple Secure Elements." Version 1.0, Feb. 2010.*

(Continued)

*Primary Examiner* — Olabode Akintola
(74) *Attorney, Agent, or Firm* — BCF LLP

(57) ABSTRACT

A device and a secure element for conducting a secured financial transaction are disclosed. The device comprises a central processing unit; a communication interface for establishing a communication between the device and a financial institution related to a financial account; an interface for acquiring data relating to the financial account; the secure element for processing at least a portion of the data relating to the financial account acquired by the interface; and control logic for acquiring a purchase amount to be debited from the financial account and for obtaining a transaction authorization from the financial institution related to the financial account, the transaction authorization being based, at least partially, on data processed solely by the secure element independently of data processed by the central processing unit. A method of conducting the secured finan- (Continued)

cial transaction, and a computer program product for execution by the secure element are also disclosed.

19 Claims, 17 Drawing Sheets

Related U.S. Application Data

(60) Provisional application No. 61/604,613, filed on Feb. 29, 2012.

(51) Int. Cl.
  *G06Q 20/20* (2012.01)
  *G06Q 20/38* (2012.01)
  *G06Q 20/40* (2012.01)
  *G06Q 20/34* (2012.01)

(52) U.S. Cl.
  CPC ......... *G06Q 20/322* (2013.01); *G06Q 20/327* (2013.01); *G06Q 20/3229* (2013.01); *G06Q 20/3278* (2013.01); *G06Q 20/34* (2013.01); *G06Q 20/353* (2013.01); *G06Q 20/388* (2013.01); *G06Q 20/3825* (2013.01); *G06Q 20/3829* (2013.01); *G06Q 20/409* (2013.01); *G06Q 20/4012* (2013.01)

(56) References Cited

U.S. PATENT DOCUMENTS

| | | |
|---|---|---|
| D505,421 S | 5/2005 | Byers et al. |
| 7,240,830 B2 | 7/2007 | Möller et al. |
| 7,844,255 B2 | 11/2010 | Petrov et al. |
| 7,941,197 B2 | 5/2011 | Jain et al. |
| 7,949,572 B2 | 5/2011 | Perrochon et al. |
| 7,971,788 B2 | 7/2011 | Quesselaire |
| 8,027,918 B2 | 9/2011 | Nielsen et al. |
| 8,055,545 B2 | 11/2011 | Mages et al. |
| 8,060,012 B2 | 11/2011 | Sklovsky et al. |
| 8,108,306 B2 | 1/2012 | Nielsen et al. |
| 8,131,645 B2 | 3/2012 | Lin et al. |
| D659,138 S | 5/2012 | Hsu et al. |
| 8,225,997 B1 | 7/2012 | Bierbaum et al. |
| 8,235,287 B2 | 8/2012 | McKelvey |
| 8,275,364 B2 | 9/2012 | Hubinak et al. |
| 8,281,998 B2 | 10/2012 | Tang et al. |
| 8,286,875 B2 | 10/2012 | Tang et al. |
| 8,302,860 B2 | 11/2012 | McKelvey |
| 8,332,931 B1 | 12/2012 | Tran et al. |
| 8,583,493 B2 | 11/2013 | Florek et al. |
| 8,606,711 B2 | 12/2013 | Florek et al. |
| 8,756,161 B2 | 6/2014 | Hasson et al. |
| 8,770,478 B2 | 7/2014 | Priebatsch |
| 8,788,418 B2 * | 7/2014 | Spodak ............ G06K 19/06206 705/41 |
| 8,807,440 B1 | 8/2014 | Von Behren et al. |
| 8,831,677 B2 | 9/2014 | Villa-Real |
| 9,003,496 B2 | 4/2015 | Lessiak et al. |
| 9,087,328 B2 | 7/2015 | Kim et al. |
| 9,184,801 B2 | 11/2015 | Li et al. |
| 9,189,783 B2 | 11/2015 | Chowdhury et al. |
| 9,330,383 B1 | 5/2016 | Vadera |
| 9,390,297 B2 | 6/2016 | Babu et al. |
| 9,424,568 B2 | 8/2016 | Khan et al. |
| 9,503,897 B2 | 11/2016 | Lessiak et al. |
| 9,507,972 B2 | 11/2016 | Babu et al. |
| 9,540,593 B2 | 1/2017 | Gonzales et al. |
| 9,582,795 B2 | 2/2017 | Dorsey et al. |
| 9,584,958 B2 | 2/2017 | Brands |
| 9,652,641 B2 | 5/2017 | Lamfalusi et al. |
| 9,892,403 B2 * | 2/2018 | Fontaine ............ G06Q 20/3227 |
| 2004/0236693 A1 | 11/2004 | Quesselaire |
| 2006/0032905 A1 | 2/2006 | Bear et al. |
| 2006/0089919 A1 | 4/2006 | Kidd et al. |
| 2006/0122902 A1 | 6/2006 | Petrov et al. |
| 2007/0106564 A1 | 5/2007 | Matotek et al. |
| 2008/0046734 A1 | 2/2008 | Kilian-Kehr |
| 2008/0051059 A1 | 2/2008 | Fisher |
| 2009/0198803 A1 | 8/2009 | Meckenstock et al. |
| 2009/0222383 A1 | 9/2009 | Tato et al. |
| 2009/0240626 A1 | 9/2009 | Hasson et al. |
| 2010/0078471 A1 | 4/2010 | Lin et al. |
| 2010/0078472 A1 | 4/2010 | Lin et al. |
| 2010/0082485 A1 | 4/2010 | Lin et al. |
| 2010/0082490 A1 | 4/2010 | Rosenblatt et al. |
| 2010/0148928 A1 | 6/2010 | Yeager et al. |
| 2010/0203870 A1 | 8/2010 | Hubinak et al. |
| 2010/0205432 A1 | 8/2010 | Corda et al. |
| 2010/0207742 A1 | 8/2010 | Buhot et al. |
| 2010/0258639 A1 | 10/2010 | Florek et al. |
| 2010/0262503 A1 | 10/2010 | Florek et al. |
| 2010/0274677 A1 | 10/2010 | Florek et al. |
| 2010/0274726 A1 | 10/2010 | Florek et al. |
| 2010/0318801 A1 | 12/2010 | Roberge et al. |
| 2010/0323617 A1 | 12/2010 | Hubinak et al. |
| 2011/0021175 A1 | 1/2011 | Florek et al. |
| 2011/0022482 A1 | 1/2011 | Florek et al. |
| 2011/0042456 A1 | 2/2011 | Masaryk et al. |
| 2011/0053556 A1 | 3/2011 | Masaryk et al. |
| 2011/0071949 A1 | 3/2011 | Petrov et al. |
| 2011/0078081 A1 * | 3/2011 | Pirzadeh ............... G06Q 20/20 705/44 |
| 2011/0112968 A1 | 5/2011 | Florek et al. |
| 2011/0196796 A1 | 8/2011 | Florek et al. |
| 2011/0238518 A1 | 9/2011 | Florek |
| 2011/0290874 A1 | 12/2011 | Tang et al. |
| 2011/0302646 A1 | 12/2011 | Ronda et al. |
| 2012/0011572 A1 | 1/2012 | Chew et al. |
| 2012/0055989 A1 | 3/2012 | Tang et al. |
| 2012/0061467 A1 | 3/2012 | Tang et al. |
| 2012/0137310 A1 | 5/2012 | Teruyama |
| 2012/0298740 A1 | 11/2012 | Hsu et al. |
| 2012/0316951 A1 | 12/2012 | Fisher |
| 2013/0006782 A1 | 1/2013 | Schwarzkopf et al. |
| 2013/0040563 A1 | 2/2013 | Kim et al. |
| 2013/0085941 A1 | 4/2013 | Rosenblatt et al. |
| 2013/0095754 A1 | 4/2013 | Moreton et al. |
| 2013/0103590 A1 | 4/2013 | Johansson et al. |
| 2013/0262299 A1 | 10/2013 | Lacroix et al. |
| 2013/0264234 A1 | 10/2013 | Cohen |
| 2014/0019367 A1 | 1/2014 | Khan et al. |
| 2014/0108256 A1 | 4/2014 | Bircher-Nagy et al. |
| 2014/0162598 A1 * | 6/2014 | Villa-Real ............... H04M 1/66 455/411 |
| 2014/0298322 A1 | 10/2014 | Gargiulo et al. |
| 2014/0324698 A1 | 10/2014 | Dolcino et al. |
| 2014/0380452 A1 | 12/2014 | Suwald |
| 2015/0007399 A1 | 1/2015 | Gonzales et al. |
| 2015/0142644 A1 | 5/2015 | Vaid et al. |
| 2015/0287025 A1 | 10/2015 | Royston |
| 2015/0334568 A1 | 11/2015 | Thill et al. |
| 2016/0026990 A1 | 1/2016 | Rezayee et al. |
| 2016/0041606 A1 | 2/2016 | Andrews et al. |
| 2016/0104148 A1 | 4/2016 | Ganzera et al. |
| 2016/0132861 A1 | 5/2016 | Fontaine et al. |
| 2016/0155111 A1 | 6/2016 | Amald et al. |
| 2016/0239817 A1 | 8/2016 | Chene |
| 2017/0004502 A1 | 1/2017 | Quentin et al. |
| 2017/0039401 A1 | 2/2017 | Naccache et al. |
| 2017/0116609 A1 | 4/2017 | Geraud et al. |
| 2017/0286938 A1 | 10/2017 | Brown et al. |
| 2018/0144334 A1 | 4/2018 | Fontaine et al. |

FOREIGN PATENT DOCUMENTS

| | | |
|---|---|---|
| CN | 201805475 U | 4/2011 |
| CN | 101923754 A | 12/2012 |
| CN | 102867255 A | 1/2013 |
| CN | 102930435 A | 2/2013 |
| EP | 1798867 A2 | 6/2007 |
| EP | 2048594 A | 4/2009 |
| EP | 2098985 A2 | 9/2009 |
| EP | 2206067 A1 | 7/2010 |

(56) References Cited

FOREIGN PATENT DOCUMENTS

| | | |
|---|---|---|
| EP | 2211481 A | 7/2010 |
| EP | 2363825 A1 | 9/2011 |
| EP | 2378453 A2 | 10/2011 |
| EP | 2206067 B1 | 11/2011 |
| EP | 2098985 A3 | 7/2012 |
| EP | 2098985 A3 | 11/2012 |
| KR | 2008026830 A | 3/2008 |
| KR | 20110115107 A | 10/2011 |
| MX | 2011004702 A | 9/2011 |
| RU | 2301449 C2 | 6/2007 |
| RU | 2436254 C2 | 12/2011 |
| SG | 186296 A1 | 1/2013 |
| TW | 201246822 A | 11/2012 |
| WO | 2003069922 A2 | 8/2003 |
| WO | 2003069922 A3 | 8/2003 |
| WO | 2005001670 A2 | 1/2005 |
| WO | 2007052116 A1 | 5/2007 |
| WO | 2007149937 A2 | 12/2007 |
| WO | 2008011628 A2 | 1/2008 |
| WO | 2009017292 A1 | 2/2009 |
| WO | 2009087539 A1 | 7/2009 |
| WO | 2009118681 A1 | 10/2009 |
| WO | 2009129749 A1 | 10/2009 |
| WO | 2010011670 A2 | 1/2010 |
| WO | 2010023574 A2 | 3/2010 |
| WO | 2010023574 A3 | 3/2010 |
| WO | 2010023574 A4 | 3/2010 |
| WO | 2010032214 A2 | 3/2010 |
| WO | 2010032215 A1 | 3/2010 |
| WO | 2010032215 A4 | 3/2010 |
| WO | 2010032216 A1 | 3/2010 |
| WO | 2010032216 A4 | 3/2010 |
| WO | 2010044041 A1 | 4/2010 |
| WO | 2010097777 A1 | 9/2010 |
| WO | 2010097777 A4 | 9/2010 |
| WO | 2010122520 A2 | 10/2010 |
| WO | 2010122520 A3 | 10/2010 |
| WO | 2010128442 A2 | 11/2010 |
| WO | 2010131226 A1 | 11/2010 |
| WO | 2010138611 A1 | 12/2010 |
| WO | 2011004339 A1 | 1/2011 |
| WO | 2011047028 A2 | 4/2011 |
| WO | 2011047028 A3 | 4/2011 |
| WO | 2011047030 A2 | 4/2011 |
| WO | 2011047030 A9 | 4/2011 |
| WO | 2011047034 A2 | 4/2011 |
| WO | 2011047038 A2 | 4/2011 |
| WO | 2011047038 A3 | 4/2011 |
| WO | 2011047042 A2 | 4/2011 |
| WO | 2011047042 A3 | 4/2011 |
| WO | 2011058455 A1 | 5/2011 |
| WO | 2011146784 A1 | 11/2011 |
| WO | 2012002852 A1 | 1/2012 |
| WO | 2012014185 A1 | 2/2012 |
| WO | 2012061467 A1 | 3/2012 |
| WO | 2012044885 A2 | 4/2012 |
| WO | 2012051067 A1 | 4/2012 |
| WO | 2012051069 A1 | 4/2012 |
| WO | 2012051070 A2 | 4/2012 |
| WO | 2012051070 A3 | 4/2012 |
| WO | 2012051073 A2 | 4/2012 |
| WO | 2012051073 A3 | 4/2012 |
| WO | 2012114260 A1 | 8/2012 |
| WO | 2012127099 A1 | 9/2012 |
| WO | 2012094301 A1 | 12/2012 |
| WO | 2012164036 A1 | 12/2012 |
| WO | 2013007630 A1 | 1/2013 |
| WO | 2013040684 A1 | 3/2013 |
| WO | 2013121053 A1 | 8/2013 |

OTHER PUBLICATIONS

EMVCo, A Guide to EMV, Version 1.0, May 2011, EMVCo, LLC., 35 pages.
English abstract of CN201805475U retrieved from Espacenet on Apr. 24, 2014.
English abstract of MX2011004702A retrieved from Espacenet on Apr. 14, 2014.
Visa's Push a Sign that U.S. is Finally Ready for Chip Cards, American Banker Website, http://www.americanbanker.com/issues/176_154/visa-emv-chip-card-1041036-1.html, printed on Apr. 24, 2014.
English abstract of EP2363825 retrieved from Espacenet on Mar. 26, 2019.
English abstract of EP2378453 retrieved from Espacenet on Mar. 26, 2019.
English abstract of KR20080026830 retrieved from Espacenet on Feb. 28, 2019.
English abstract of TW201246822 retrieved from Espacenet on Mar. 26, 2019.
English abstract of CN101976402 retrieved from Espacenet on Nov. 26, 2015.
LGM Card, Low cost terminal for profitable micro payments at the smallest merchants, Logomotion, Sep. 2012, DS_No. 4 v001, www.lgmcard.com.
English abstract of CN1101950453 retrieved from Espacenet on Nov. 26, 2015.
English abstract of CN102930435 retrieved from Espacenet on Dec. 20, 2016.
English abstract of CN102867255 retrieved from Espacenet on Dec. 20, 2016.
English abstract of CN101923754 retrieved from Espacenet on Dec. 20, 2016.
Search report from CN201380011751.7 dated Nov. 25, 2016.
Kurokawa et al., NEC Technical Journal, ISSN 0285-4139, Issued Feb. 28, 2006, vol. 430, No. 1, vol. 59, Original Japanese.
Kurokawa et al., NEC Technical Journal, ISSN 0285-4139, Issued Feb. 28, 2006, vol. 430, No. 1, vol. 59, English translation.
Card Wave, Card Business & Mobile Commerce Information Journal, Creating customers in an economic downturn, Apr. 2009, No. 261, Japanese Technical Journal 2009-00200-001, Original Japanese.
Card Wave, Card Business & Mobile Commerce Information Journal, Creating customers in an economic downturn, Apr. 2009, No. 261, Japanese Technical Journal 2009-00200-001, English translation.
SFR SA. "(U)SIM Java Card Platform Protection Profile Basic and SCWS Configurations", PU-2009-RT-79, SFR SA., Jun. 17, 2010.
Das et al. "A Security Framework for Mobile to Mobile Payment Network", Personal Wireless Communications 2005, Jan. 25, 2005.
Vincent Alimi, English Abstract of the thesis, Contribution au déploiement des services mobiles et à l'analyse de la sécurité des transactions, Dec. 18, 2012, Thèse présentée àl'Université de Caen Basse-Normandie, France, 216 pages.
U.S. Appl. No. 16/251,827, filed Jan. 18, 2019.
U.S. Appl. No. 16/251,885, filed Jan. 18, 2019.
U.S. Appl. No. 16/253,726, filed Jan. 22, 2019.
U.S. Appl. No. 16/253,771, filed Jan. 22, 2019.
U.S. Appl. No. 16/253,798, filed Jan. 22, 2019.
English abstract of KR20110115107 retrieved from Espacenet on Mar. 19, 2019.
English abstract of RU 2436254 retrieved from Espacenet on Mar. 19, 2019.
English abstract of RU 2301449 retrieved from Espacenet on Mar. 19, 2019.
Summons to attend oral proceedings for European Patent Application No. 13 754 465.6 dated Dec. 12, 2019.

* cited by examiner

METHOD, DEVICE AND SECURE ELEMENT FOR CONDUCTING A SECURED FINANCIAL TRANSACTION ON A DEVICE

CROSS-REFERENCE TO RELATED APPLICATION(S)

The present application is a continuation application of U.S. patent application Ser. No. 14/371,828 filed on Aug. 20, 2014 which is a national stage entry of international patent application PCT/CA2013/000185 filed on Feb. 28, 2013 which claims priority from U.S. provisional patent application 61/604,613 filed on Feb. 29, 2012, the entirety of which is hereby incorporated by reference.

FIELD OF THE INVENTION

The present invention relates to a method, device and secure element for conducting a secured transaction on a device, in particular a secured financial transaction.

BACKGROUND OF THE INVENTION

This section is intended to introduce the reader to various aspects of art that may be related to various aspects of the present disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Merchants often use payment terminals to conduct secured financial transactions with customers. Such customers usually hold payment cards issued by a financial institution or a payment card institution. In some instances, the payment cards include a magnetic strip and/or a smart card chip allowing a transaction to be initiated by swiping the card in a magnetic strip reader of a payment terminal or by introducing the payment card in a smart card reader of a payment terminal. In other instances, the payment card may also be contactless transaction enabled to allow a transaction to occur by presenting the payment card proximate to a payment terminal. In order to ensure security during the financial transactions, security standards such as the Europay, MasterCard, and Visa (EMV) transaction standard have been developed and used to certify both the payment terminals and the payment cards. However, due to various factors, including the technical complexity required to meet the security standards, payment terminals that are used to conduct secured financial transactions are usually devices that are solely dedicated to the conduct of financial transactions.

There is therefore a need in the art for a method, device and secure element for conducting secured transactions, from any devices, in particular from devices that offer other functionalities than the mere conduct of financial transactions.

SUMMARY OF THE INVENTION

It is an object of the present invention to provide a method of conducting a secured financial transaction on a device used as a payment terminal, the device comprising a central processing unit and a secure element. The method comprises acquiring a purchase amount to be debited from a financial account, acquiring data relating to the financial account through the device, and obtaining a transaction authorization from a financial institution related to the financial account. The authorization is based, at least partially, on data processed solely by the secure element independently of data processed by the central processing unit. The data processed solely by the secure element include at least a portion of the acquired data relating to the financial account.

It is another object of the present invention to provide a device used as a payment terminal for conducting a secured financial transaction. The device comprises a central processing unit, a communication interface configured to establish a communication between the device and a financial institution related to a financial account, an interface for acquiring data relating to the financial account, a secure element for processing at least a portion of the data relating to the financial account acquired by the interface, and control logic configured to acquire a purchase amount to be debited from the financial account and to obtain a transaction authorization from the financial institution related to the financial account. The transaction authorization is based, at least partially, on data processed solely by the secure element independently of data processed by the central processing unit. The data processed solely by the secure element include at least a portion of the acquired data relating to the financial account.

It is another object of the present invention to provide a secure element for installation in a device used as a payment terminal. The secure element comprises instructions to run an Europay, MasterCard, and Visa (EMV) transaction module that is configured to process data acquired by an interface of the device in accordance with a certification standard; and an operating system (OS) configured to process data provided by the EMV transaction module in accordance with the Level 1 of the EMVCo standard.

It is another object of the present invention to provide a computer program product for execution by a device used as a payment terminal, the device having a computer readable storage medium embedding computer program logic. The computer program logic, upon execution by the device, runs an Europay, MasterCard, and Visa (EMV) transaction module that is configured to process data acquired by an interface of the device in accordance with a certification standard; and an operating system (OS) configured to process data provided by the EMV transaction module in accordance with the Level 1 of the EMVCo standard.

It is another object of the present invention that a transaction module running on a secure element of a device used as a payment terminal executes a reception from a payment control application running on the device of a request to conduct a financial transaction, an acquisition via an interface of the device of data relating to a financial account from a payment apparatus, an establishment of a secured communication channel with a server of a financial institution related to the financial account through a communication interface of the device, a sending over the secured communication channel to the server of an authorization request to perform the financial transaction, the authorization request comprising at least a portion of the data related to the financial account, a reception over the secured communication channel from the server of a response to the authorization request, a processing of the response to the authorization request to generate a status of the financial transaction, and a sending to the payment control application of the status of the financial transaction.

BRIEF DESCRIPTION OF THE DRAWINGS

The present invention will now be described in connection with the drawings appended hereto, in which.

Figure 1:
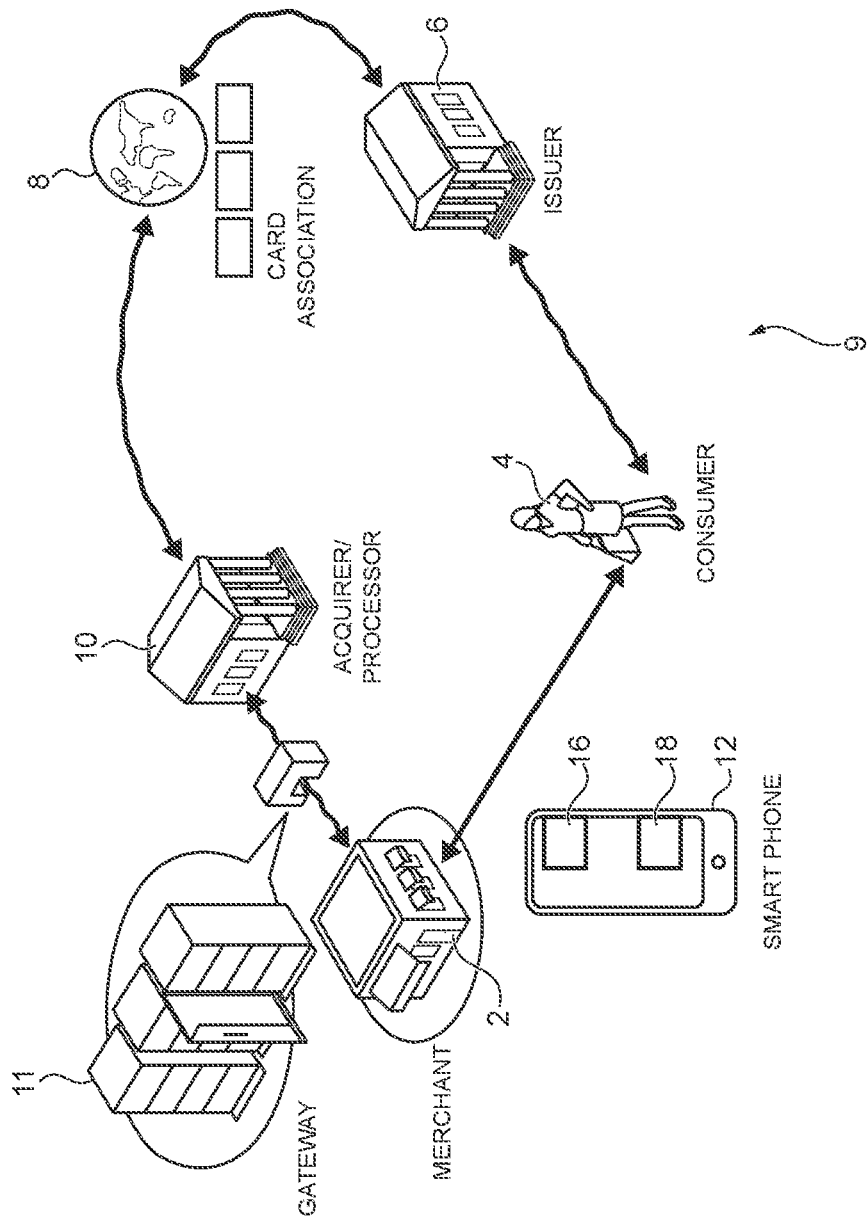
FIG. 1 is a diagrammatical representation of a system for conducting a secured financial transaction from a secured device in accordance with one embodiment of the present invention.

In the drawings, embodiments of the invention are illustrated by way of example. It is to be expressly understood that the description and drawings are only for purposes of illustration and as an aid to understanding. They are not intended to be a definition of the limits of the invention.

DETAILED DESCRIPTION OF EMBODIMENT(S) OF THE INVENTION

The present invention will now be described in connection with one or more contemplated embodiments. The embodiments that are described are intended to be exemplary of the present invention and not limiting of the scope thereof. In other words, while attention is focused on specific embodiments of the present invention, those embodiments are not intended to limit the present invention. To the contrary, the examples provided below are intended to illustrate the broad scope of the present invention.

Terminology

Throughout the present disclosure, reference is made to secure transactions (for example, but without being limitative, contact and contactless transactions), secure elements (for example, but without being limitative, chipset, secured chipset, hardware embedding secured component, software embedding secured component, or firmware embedding secured component) and security standards. Examples of security standards include, without being limitative, certification standards from Europay, MasterCard, and Visa (EMV), EMVCo, MasterCard®, Visa®, American Express®, JCB®, Discover® and the PCI SSC (Payment Card Industry Security Standards Council (founded by MasterCard®, Visa®, American Express®, Discover® and JCB® and) dealing specifically with the definition of security standards for financial transactions). Reference to secure transactions, secure elements, and security standards is made for the purpose of illustration and is intended to be exemplary of the present invention and not limiting of the scope thereof.

Secure element: a processing entity characterized by specific hardware and/or software components subject to a certification ensuring a specific level of security according to specific security standards. From a hardware perspective, a secure element includes usual components found in a computing entity: at least one microcontroller (e.g. CPU), memory (e.g. RAM or FLASH memory), communication interfaces, etc. Specific hardware components may also be included to implement specific functionalities particular to a secure element. For instance, a cryptographic accelerator may be included. Also, a module providing RF and electrostatic insulation may be included, to protect the secure element 16 from eavesdropping. In the context of financial transactions, the certification of the secure element ensures that various financial entities are willing to use the secure element to store and process critical financial data, and to perform secured financial transactions using the critical financial data.

Information/data: the terms "information" and "data" are used interchangeably, and have a similar meaning for the purpose of the present disclosure.

Security standards may comprise multiple security levels, such as, but without being limitative, Level 1, Level 2, or Level 3. As an example, but without being limitative, Level 1 may correspond to a higher level of security than Level 2 which, in turn, may correspond to a higher level of security than Level 3. For example, but without being limitative, the EMCo standard may provide examples of security levels and approval and certification standards such as terminal type approval process, security evaluation process, card type approval process, or mobile type approval process.

For example, the terminal type approval process may be a mechanism to test compliance with Europay, MasterCard, and Visa (EMV) specifications. The terminal type approval may provide a level of confidence that interoperability and consistent behavior between compliant applications may be achieved. In an example, the terminal type approval testing may be divided into two levels, Level 1 and Level 2. The Level 1 type approval process may test compliance with the electromechanical characteristics, logical interface, and transmission protocol requirements defined in the EMV specifications. The Level 2 type approval may test compliance with the debit/credit application requirements as defined in the EMV specifications. Additionally, the terminal type approval testing may include a Level 3 approval, which guarantees secure communications between an application executed on the terminal and a financial institution.

For example, the security evaluation process may be intended to provide EMVCo members' issuers with information relating to the general security performance characteristics and the suitability of use for smart card related products and integrated circuits (IC) chip-based tokens. The EMVCo security evaluation process may be designed to ensure a robust security foundation for these products at the product family and component level. Alternatively, the security evaluation process may be intended to provide PCI SSC members' issuers with information relating to the general security performance characteristics and the suitability of use for smart card related products and integrated circuits (IC) chip-based tokens. In the case of PCI SSC, the software layers are also covered by the security standards and requirements.

For example, the card type approval process may create a mechanism to test compliance with the EMV and common payment application (CPA) specifications. The card type approval process may provide a level of confidence that interoperability and consistent behavior between compliant applications may be achieved. Separate card type approval processes may be defined for cards implementing the common core definitions (CCD) specifications, or cards implementing the CPA specifications.

For example, the mobile type approval process may comprise a contactless mobile payment (CMP) product type approval process to create a mechanism to test compliance with the EMV specifications. The CMP product type approval process may provide a level of confidence that interoperability and consistent behavior between compliant mobile products may be achieved.

Contactless interface: a contactless interface is an interface between two entities (e.g. a mobile phone and a credit card in the context of the present disclosure), which allows an exchange of data between the two entities without physical contacts. Although Near Field Communication (NFC) interfaces are mentioned in the present disclosure, any technology and communication protocols allowing a contactless exchange of data between two entities is relevant to the present disclosure.

System and Method for Conducting a Secured Financial Transaction on a Device

FIG. 1 illustrates a diagrammatical representation of a system 9 for conducting a secured financial transaction from a device 12 in accordance with one embodiment of the present invention. In one embodiment of the present invention, a customer 4 is in a contractual relationship with a financial institution 6 holding a customer's financial account. The financial institution 6 may be a bank that maintains the customer's checking account or credit card account. The financial institution 6 provides the customer 4 with a token to provide strong authentication during financial transactions. Such a token may be, for example, a payment card and/or a secured unique identification component which may be embedded in a device of the customer 4 (e.g. a mobile phone). The payment card is held by the payment card company 8 and may be, for example but without being limitative, a debit card from the company Interac® or a credit card from one of the credit card companies such as MasterCard®, Visa®, American Express®, JCB®, and Discover®. The payment card may embody data related to the customer's financial account through a magnetic strip, a smart card chip and/or through a tag having radio frequency identification (RFID) circuitry. The tag including RFID circuitry may provide contactless transaction capabilities, in particular contactless transaction capabilities compliant with Europay, MasterCard, and Visa (EMV) security standards (e.g. Visa Paywave®, MasterCard PayPass®, American Express ExpressPay®, Interac Flash®, Discover Zip®). In alternative embodiments, the tag including the RFID circuitry may be embedded in other support than a payment card, for example, in a device such as a mobile phone (e.g. a Google Wallet® module embedded in a customers' device). The data related to the customer's financial account may be any kind of data that allow a financial account to be identified during a transaction. For example, but without being limitative, such data may include keys, certificates, and payment card numbers.

A merchant 2 is in a contractual relationship with a financial institution 10 holding a merchant's financial account. The financial institution 10 may be a bank that maintains the merchant's checking account or credit card account. The financial institution 10 allows the merchant 2 to conduct financial transactions, through a gateway 11, with customers, for example with the customer 4. Although the gateway 11 is shown in FIG. 1, it should be understood that the financial transactions may occur directly between the merchant 2 and the financial institution 10 with no gateway in between. In an embodiment of the present invention, the merchant 2 may initiate and complete a secured financial transaction with the customer 4 through the device 12. The device 12 comprises a secure element 16 and an interface 18. In one embodiment of the present invention, the interface 18 may be, for example but without being limitative, a magnetic strip reader, a smart card reader, or a near field communication (NFC) interface. The interface 18 allows a contact and/or a contactless transaction between a payment card of the customer 4 and/or a device of the customer 4 to occur on the device 12. It should be understood that a contact transaction may be, for example but without being limitative, swiping a magnetic strip in a magnetic strip reader or contacting a smart card chip with a smart card reader. In addition, it should be understood that a contactless transaction may comprise a transaction in which a payment card or a mobile device may physically contact a contactless reader. As such, contactless transaction may refer to a communication that could have occurred contactlessly but during which the payment card or the mobile device physically contacted the contactless reader. In one embodiment of the present invention, the transaction is a financial transaction that is secured and that is compliant with the EMV transaction standard and the applicable PCI SSC standards. The applicable PCI SSC standards may be one of the Payment Application Data Security Standard (PA-DSS), PIN Transaction Security (PTS) and/or Point-to-Point Encryption (P2PE). In other embodiments, the transaction may be compliant with other secured transaction standards.

Figure 2:
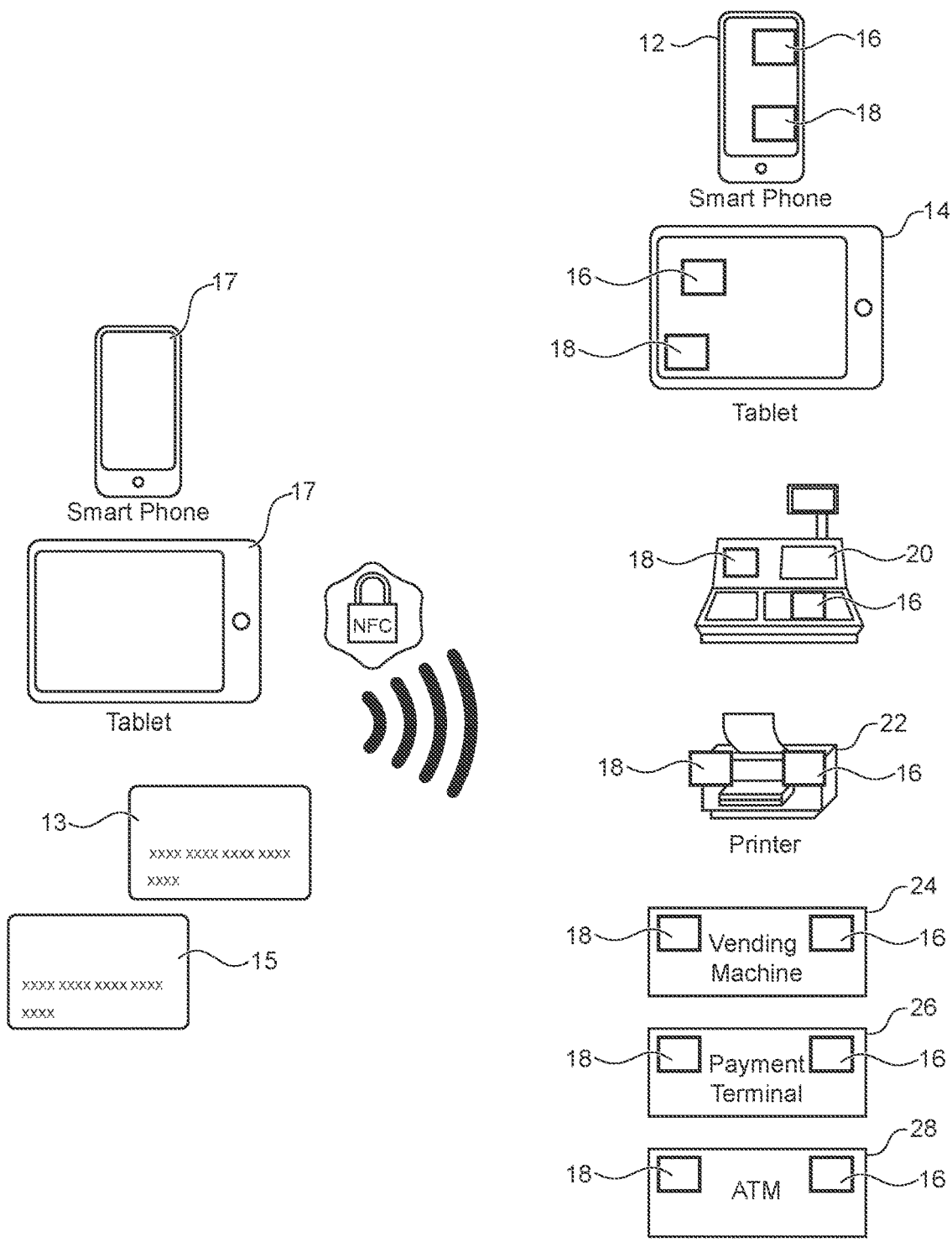
FIG. 2 is a diagrammatical representation of a contactless transaction occurring in accordance with one embodiment of the present invention.

Reference is now concurrently made to FIGS. 1 and 2, where FIG. 2 is a diagrammatical representation of a contactless transaction occurring between the customer 4 and the merchant 2 of FIG. 1. In one embodiment of the present invention, the transaction is a secured financial transaction and is initiated by the merchant 2 through the device 12 which is in communication with the financial institution 10 and the payment card company 8. The merchant 2 initiates the transaction by entering a purchase amount in the device 12. Then, the customer 4 presents her/his payment card, for example the Visa Paywave® contactless enabled credit card 13 proximate the interface 18, in this example a NFC interface, of the device 12 to establish a communication between the Visa Paywave® contactless enabled credit card 13 and the secure element 16 of the device 12. Once the secure element 16 completes the reading of the data from the Visa Paywave® contactless enabled credit card 13, the device 12 may prompt the customer 4 to enter a personal identification number (PIN), a signature, a passcode, biometrics data or any data allowing confirmation of the customer's identity. Once the required information is entered by the customer 4, the financial transaction authorization is requested by the device 12 to the financial institution 6 of the customer 4 and/or to the payment card company 8. In turn, the financial institution 6 of the customer 4 and/or the payment card company 8 authorize or refuse (as the case may be) the financial transaction and communicate with the device 12 to notify the authorization status. Once the financial transaction status is received by the device 12, the customer 4 is notified that the financial transaction has been accepted or declined by the financial institution 6 of the customer 4 and/or the payment card company 8. In other embodiments of the present invention, the customer 4 may initiate the financial transaction by using a MasterCard PayPass® contactless enabled credit card 15, a mobile phone (or a tablet computer) 17 comprising a RFID circuitry providing secured contactless transaction capabilities. In other embodiments of the present invention, the secure element 16 and the interface 18 may be embedded in other devices than the device 12. For example, but without being limitative, the secure element 16 and the interface 18 may be embedded in devices such a tablet computer 14, a cash register 20, a printer 22, a vending machine 24, a payment terminal 26, and/or an automatic telling machine (ATM) 28 (in which case the customer 4 may conduct a transaction without having to interact with the merchant 2, i.e. by solely interacting with her/his payment card company 8 or her/his financial institution 6). Other examples of devices on which the secure element 16 and the interface 18 may be embedded include, but without being limitative, a TV, a video game system, a setup box to access the Internet, or an Apple TV® from Apple Inc.

Figure 3:
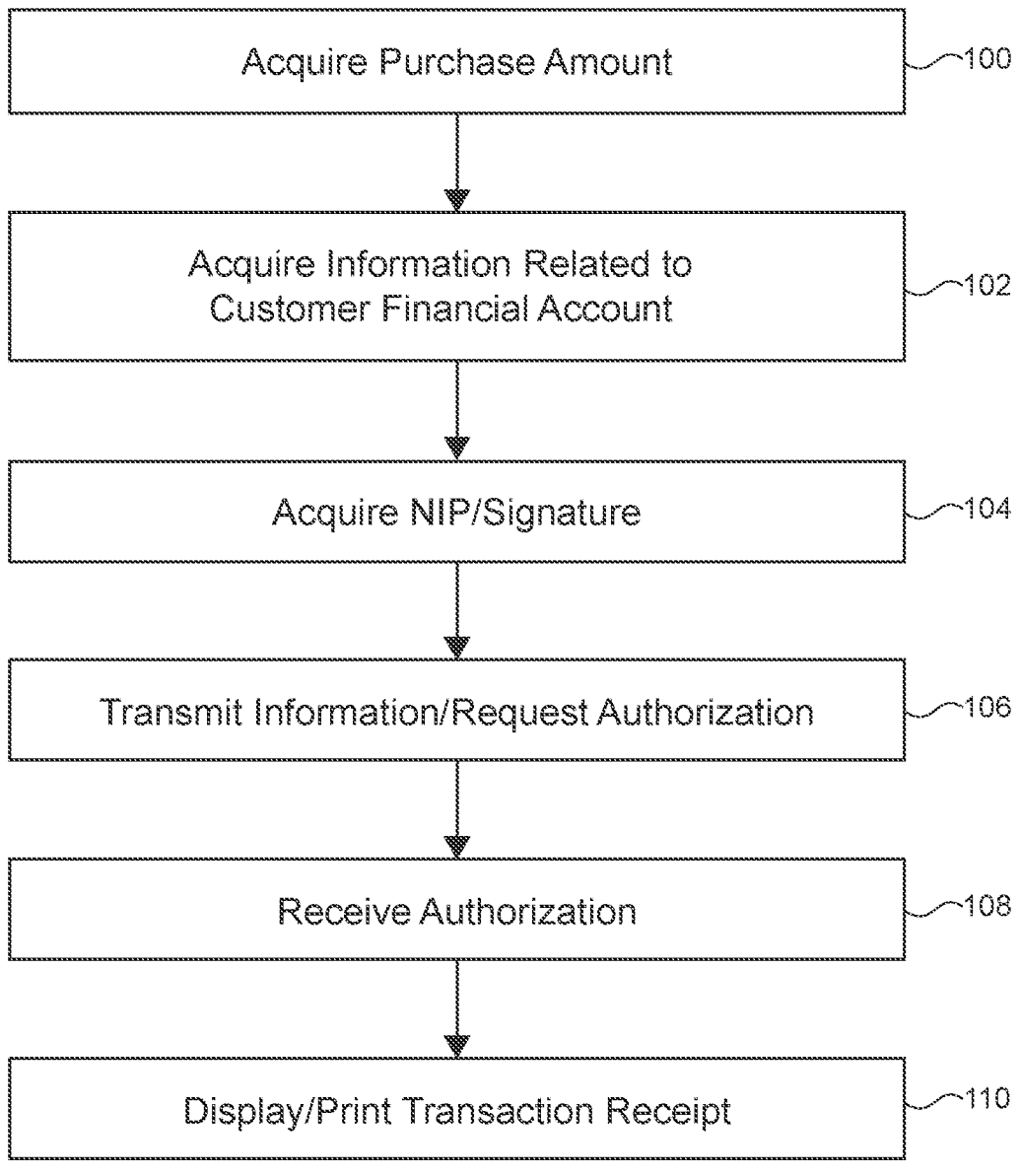
FIG. 3 is a flowchart depicting a method of conducting a secured financial transaction in accordance with one embodiment of the present invention.

FIG. 3 is a flowchart depicting a method of conducting a transaction 111 in accordance with one embodiment of the present invention. The method 111 may be employed to conduct various types of transactions, such as, but not limited to, secured contact and/or contactless financial transactions. The method 111 may be embodied in a software application such as a point of sale application 112 running on the device 12. The point of sale application 112 may comprise various software components allowing a transaction to be conducted between the customer 4 and the merchant 2 in accordance with the method 111. In particular, some of the various software components may be executed on the secure element 16 of the device 12, while other software components are executed by a CPU of the device 12.

For illustration purposes, the interface 18 of the device 12 is a NFC interface capable of reading data on a contactless enabled payment card. The method 111 may begin at step 100 by the merchant 2 entering a purchase amount in the device 12. Then, at step 102, the customer 4 presents her/his payment card, for example the Visa Paywave® contactless enabled credit card 13 proximate the NFC interface 18 of the device 12 to establish a communication between the Visa Paywave® contactless enabled credit card 13 and the secure element 16 of the device 12. Once the secure element 16 completes the reading of the data from the Visa Paywave® contactless enabled credit card 13, the device 12 may prompt, at step 104, the customer 4 to enter a personal identification number (PIN), a signature, a passcode, biometrics data or any data allowing confirmation of the customer's identity. Once the required information is entered by the customer 4, the financial transaction authorization is requested, at step 106, by the device 12 to the financial institution 6 of the customer 4 and/or to the payment card company 8. In turn, the financial institution 6 of the customer 4 and/or the payment card company 8 authorize or refuse (as the case may be) the financial transaction and communicate with the device 12, at step 108, to notify the authorization status. Once, the financial transaction status is received by the device 12, the customer 4 is notified, at step 110, that the financial transaction has been accepted or declined by the financial institution 6 of the customer 4 and/or the payment card company 8. The financial transaction status may be provided to the customer 4 in the form of a transaction receipt. The transaction receipt may be an electronic receipt displayed on the device 12 or sent to the customer via electronic means (e.g. via an email, a multimedia message service (MMS), and/or a short message service (SMS)). The transaction receipt may also be a physical receipt (e.g. paper receipt) generated by a printer in communication with the device 12.

In another embodiment of the present invention, the device 12 may securely read data from a loyalty card, a gift card, a prepaid card, a coupon card, a rewards card, a points card, an advantage card, a club card, etc; and perform a secure transaction with an institution related to the card (the institution identifies the card holder as a member of a loyalty program). The communications between the device 12 and the card may be a contactless transaction, using for example the NFC interface 18 of the device 12. The secure transaction with the institution related to card may consist in validating the availability of sufficient loyalty points on the account of a customer.

Device for Conducting a Secured Financial Transaction

Figure 4:
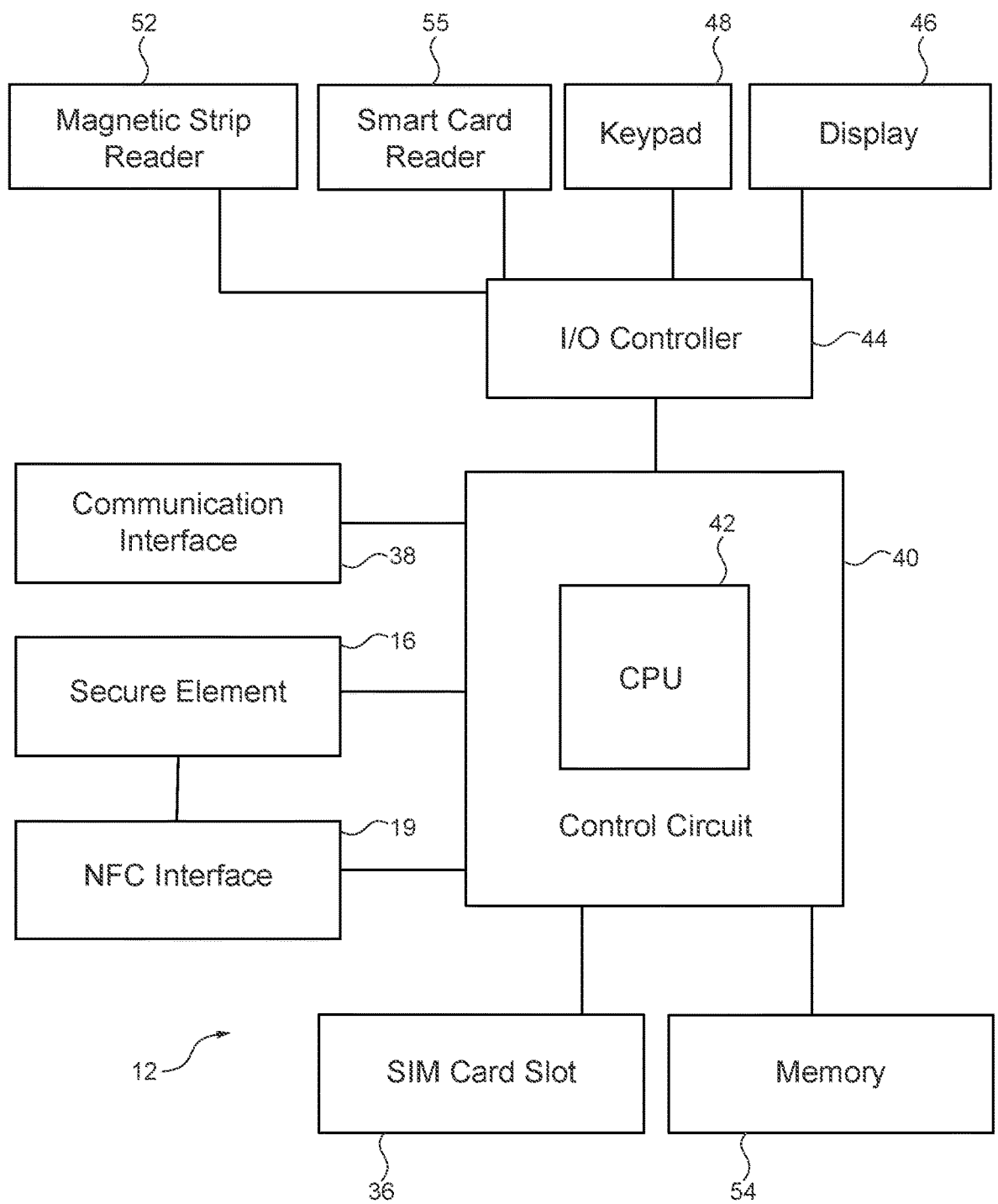
FIG. 4 is a simplified block diagram of a device on which a secured financial transaction may occur in accordance with one embodiment of the present invention.

Additional details of the device 12 may be better understood through reference to FIG. 4, which is a block diagram illustrating various exemplary components and features of the illustrative device 12 in accordance with one embodiment of the present invention. The device may include the secure element 16, a NFC interface 19, a smart card reader 55, a subscriber identity module (SIM) card slot 36, a communication interface 38, a control circuit 40, a central processing unit (CPU) 42 on which an operating system (OS) of the device 12 is running, an input/output (I/O) Controller 44, a display 46, a keypad 48, a printer (not represented in FIG. 4), a magnetic strip reader 52, and a memory 54. Examples of OS running on the CPU 42 include, but are not limited to, a version of iOS®, or a derivative thereof, available from Apple Inc.; a version of Android OS®, or a derivative thereof, available from Google Inc.; a version of PlayBook OS®, or a derivative thereof, available from RIM Inc. It is understood that other proprietary OS or custom made OS may be equally used without departing from the scope of the present invention.

In one embodiment of the present invention, the device 12 is controlled by the CPU 42 and the control circuit 40 to provide the processing capability required to execute the OS of the device 12. The CPU 42 may include a single processor or a plurality of processors. For example, the CPU 42 may include "general purpose" microprocessors, a combination of general and special purpose microprocessors, instruction set processors, graphic processors, or special purpose processors. The control circuit 40 may include one or more data buses for transferring data and instructions between components of the device 12. The control circuit 40 may also include on board memory for caching purposes.

In certain embodiments of the present invention, information used by the CPU 42 may be located in the memory 54. The memory 54 may be a non-volatile memory such as read only memory, flash memory, a hard drive, or any other suitable optical, magnetic, or solid-state computer readable media, as well as a combination thereof. The memory 54 may be used for storing data required for the operation of the CPU 42 as well as other data required for the device 12. For example, the memory 54 may store the firmware of the device 12. The firmware may include the OS, as well as other programs that enable various functions of the electronic device 12, graphical user interface (GUI) functions, or processor functions. The memory 54 may store components for a GUI, such as graphical elements, screens, and templates. The memory 54 may also include data files such as connection information (e.g. information used to establish a communication), or data allowing the device 12 to run a payment control application. The payment control application is one of the software components (executed by the CPU 42 of the device 12) of the point of sale application 112. The data stored in the memory 54 allowing the device 12 to run the payment control application includes data to generate a GUI on the display 46 used to conduct a secured financial transaction and the required processing capabilities to complete a secured financial transaction. In addition, the memory 54 may store data to control the activation/deactivation of the NFC interface 19 and, when activated, control the operation mode of the NFC interface 19 (e.g. passive or active). For example, the NFC interface 19 may operate in passive mode unless the point of sale application 112 is running.

The communication interface 38 may provide additional connectivity channels for receiving and transmitting information. For example, the communication interface 38 may provide connectivity functions to allow the device 12 to communicate with the entity processing credit card information 8 through the gateway 11 and a bank server of the financial institution 10. The communication interface 38 may represent, for example, one or more network interface cards (NIC) or a network controller as well as associated communication protocols. The communication interface 38 may include several types of interfaces, including but not limited to, a wireless local area network (WLAN) interface, a local area network (LAN) interface, a wide area network (WAN) interface, a multimedia message service (MMS), and a short message service (SMS) interface.

In certain embodiments, the device 12 may use a device identification networking protocol to establish a connection with an external device through a network interface. For example, both the device 12 and the external device may broadcast identification information using internet protocol (IP). The devices may then use the identification information to establish a network connection, such as a LAN connection, between the devices.

The NFC interface 19 may allow for close range communication at various data rates complying, for example, with standards such as ISO 14443, ISO 15693, ISO 18092 or ISO 21481. The NFC interface 19 may be implemented through a NFC device embedded in a chipset that is part of the device 12. Alternatively the NFC interface 19 may be implemented through a NFC device that is a separate component and that communicates through the communication interface 38 with the device 12, or through an additional port of the device 12 (not represented in FIG. 4). The NFC interface 19 may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication. In certain embodiments, the NFC interface 19 may be used to receive information, such as the service set identifier (SSID), channel, and encryption key, used to connect through another communication interface. In one embodiment of the present invention, the NFC interface 19 is in direct communication with both the secure element 16 and the control circuit 40. In alternative embodiments of the present invention, the NFC interface 19 may be connected, for example but without being limitative, to the control circuit 40, the I/O controller 44, or both.

The NFC interface 19 may control the near field communication mode of the device 12. For example, the NFC interface 19 may be configured to switch the device 12 between a reader/writer mode for reading NFC tags, a peer-to-peer mode for exchanging data with another NFC enabled device, and a card emulation mode for allowing another NFC enabled device to read data. The NFC interface 19 also may be configured to switch the device 12 between an active mode where the device 12 generates its own RF field and a passive mode where the device 12 uses load modulation to transfer data to another device generating a RF field. Operation in passive mode may prolong the battery life of the device 12. In certain embodiments, the modes of the NFC interface 19 may be controlled based on user or manufacturer preferences.

In an embodiment, the NFC communication may occur within a range of approximately 2 to 4 cm. The close range communication with the NFC interface 19 may take place via magnetic field induction, allowing the NFC interface 19 to communicate with other NFC devices or to retrieve data from tags having RFID circuitry. As discussed above with reference to FIG. 2, the NFC interface 19 may be used to acquire data, in particular data enabling a secured contactless financial transaction, from the credit cards 13 and 15 or from the mobile devices (smartphone or tablet computer) 17.

The secure element 16 is configured to enable the point of sale application 112 to run on the device while providing sufficient level of security to meet the security standards established for EMV transactions. In an embodiment, the secure element 16 is embodied in a chipset connected to the control circuit 40 that cooperates with the NFC interface 19 to provide the contactless payment functionality. In another embodiment, the secure element 16 is embodied in a chipset connected to the control circuit 40 that cooperates with the smart card reader 55 to provide the payment functionality. In still another embodiment, the secure element 16 is embodied in a chipset connected to the control circuit 40 that cooperates with the magnetic strip reader 52 to provide the payment functionality. For example, but without being limitative, the chipset on which the secure element 16 is embodied may be a model of the ST32® or ST33® chipset family, or a derivative thereof, available from STMicroelectronics Inc. The secure element 16 will be described in more details below with reference to FIG. 5.

The SIM card slot 36 allows a SIM card to be introduced within the device 12. The SIM card introduced within the SIM card slot 36 contains an International Mobile Subscriber Identity (IMSI) and the related key used to identify and authenticate the user of the device 12.

The I/O Controller 44 may provide the infrastructure for exchanging data between the control circuit 40, the CPU 42, and the input/output devices. The I/O controller 44 may contain one or more integrated circuits and may be integrated within the control circuit 40 or exist as a separate component. The I/O controller 44 may provide the infrastructure for communicating with the display 46, the keypad 48, the printer (not represented in FIG. 4), the magnetic strip reader 52, or the smart card reader 55. Although the magnetic strip reader 52 and the smart card reader 55 are shown on FIG. 4 connected to the I/O controller 44, it should be understood that the magnetic strip reader 52 and the smart card reader 55 may be, for example but without being limitative, in direct connection with the control circuit 40 and/or the secure element 16.

The I/O controller 44 may also provide the infrastructure for communicating with external devices and may be used for connecting the device 12 to an external computer, bar code scanner, audio headphones, or the like.

In an embodiment of the invention, the device 12 is a mobile device which portability makes it particularly well suited to perform mobile sales transactions. For example, the mobile device may be, but is not limited to, a mobile phone (for example a model of an iPhone®, or a derivative thereof, available from Apple Inc.; a model of a Blackberry®, or a derivative thereof, available from RIM Inc.; a model of a Galaxy®, or a derivative thereof, available from Samsung Inc.), a tablet computer (for example a model of an iPad®, or a derivative thereof, available from Apple Inc.; a model of a Galaxy Tab®, or a derivative thereof, available from Samsung Inc.; a model of a PlayBook®, or a derivative thereof, available from RIM Inc.), and a laptop computer. To facilitate transport and ease of motion, the device 12 may include an integrated power source for powering the device 12. The power source may include one or more batteries, such as a Li-ion battery, which may be user-removable or secured to the device 12.

Due to the portability of the device 12, the sales transaction may be conducted within a wide variety of environments. For example, the sales transaction may occur in a taxi car, or upon delivery of an article at the door of a customer's house. In addition, the present invention provides a merchant with the ability to conduct a financial transaction through a device other than a dedicated payment terminal, for example through a mobile phone embedding the secure element 16, the NFC interface 19, the smart card reader 55, the magnetic strip reader 52, or various combinations thereof.

In an alternative embodiment of the invention, the secure element 16, the NFC interface 19, the smart card reader 55, the magnetic strip reader 52, or a combination thereof may be embedded on non-mobile devices to run the point of sale application 112, for example, in a printer, a personal computer, a cash register, a payment terminal, an automatic telling machine (ATM), a vending machine, a TV, a video game system, a setup box to access the Internet, or an Apple TV® from Apple Inc. Due to the wide variety of devices that may embody the secure element 16 and the interface 18, a wide variety of secured transactions may be conducted. For example, a customer may order a movie from her/his TV and conduct a secured transaction directly on her/his TV embedding the secure element 16 and the interface 18.

Figure 5:
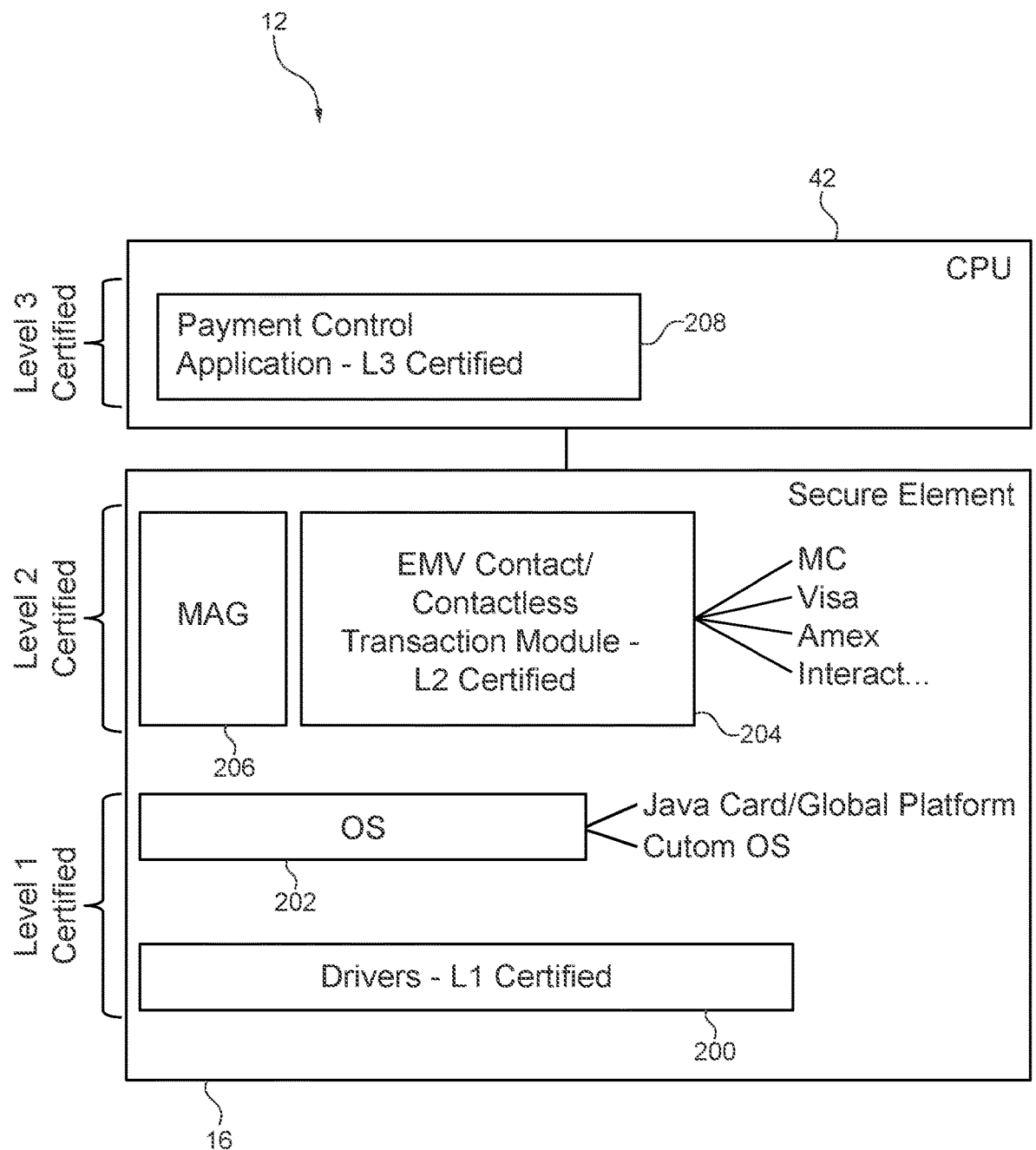
FIG. 5 is a diagrammatical representation of a secure element embedded in the device of FIG. 4 in accordance with one embodiment of the present invention.

Point of Sale Application for Conducting a Secured Financial Transaction on a Device FIG. 5 illustrates a schematic representation of an architecture allowing the point of sale application 112 to run on the device 12 and to conduct an EMV certified secured transaction. In an embodiment of the present invention, the architecture is implemented as a combination of pre-programmed hardware or firmware elements (for example application specific integrated circuits (ASICs) running on a chipset implementing the secure element 16 and a software component stored in the memory 54 run by the CPU 42 upon activation of the point of sale application 112. It should be understood that it is equally feasible that the components running on the secure element 16 be solely pre-programmed hardware elements or, alternatively, solely firmware or software elements. In an embodiment of the present invention, the chipset on which the secure element 16 is implemented includes memory and processing capabilities (e.g. controller and/or microprocessor).

The software component stored in the memory 54 run by the CPU 42 upon activation of the point of sale application 112 includes a payment control application 208. It is also contemplated that the payment control application 208 may be stored elsewhere than in the memory 54. In an embodiment of the invention, the payment control application 208 is run by the OS running on the CPU 42. The payment control application 208 includes instructions to control the secure element 16 so as to initiate and complete a financial transaction compliant with the EMV transaction standards (e.g. MasterCard®, Visa®, American Express®, Interac®), in particular contactless transactions compliant with the EMV contactless transaction standards (Visa Paywave®, MasterCard PayPass®, American Express ExpressPay®, Interac Flash®, Discover Zip®). The payment control application 208 manages the communications between the customer 4 and at least one of the merchant 2, the financial institution 10, the financial institution 6, and the payment card company 8. The payment control application 208 manages directly or indirectly the display of a transaction in progress on the display 46, through the I/O Controller 44. The payment control application 208 may also manage, through the secure element 16, the processing of data read by the NFC interface 19 from payment cards or from RFID-enabled devices. The payment control application 208 may also manage, through the secure element 16, the processing of data read by the smart card reader 55 from payment cards. The payment control application 208 may also manage, through the secure element 16, the processing of data read by the magnetic strip reader 52 from payment cards. In addition, payment control application 208 may also manage, through the secure element 16, the processing of data such as, for example, personal identification number (PIN), user signature, a passcode, user biometrics data or any data allowing a secure identification of a user. The payment control application 208 is designed so as to be Level 3 certified for secured payment card data processing in accordance with standards from major payment brands such as for example, but without being limitative, MasterCard®, Visa®, American Express®, JCB®, and Discover®.

The components of the secure element 12 implementing the point of sale application 112 will be further detailed later in the description, when addressing the description of the secure element.

Figure 7:
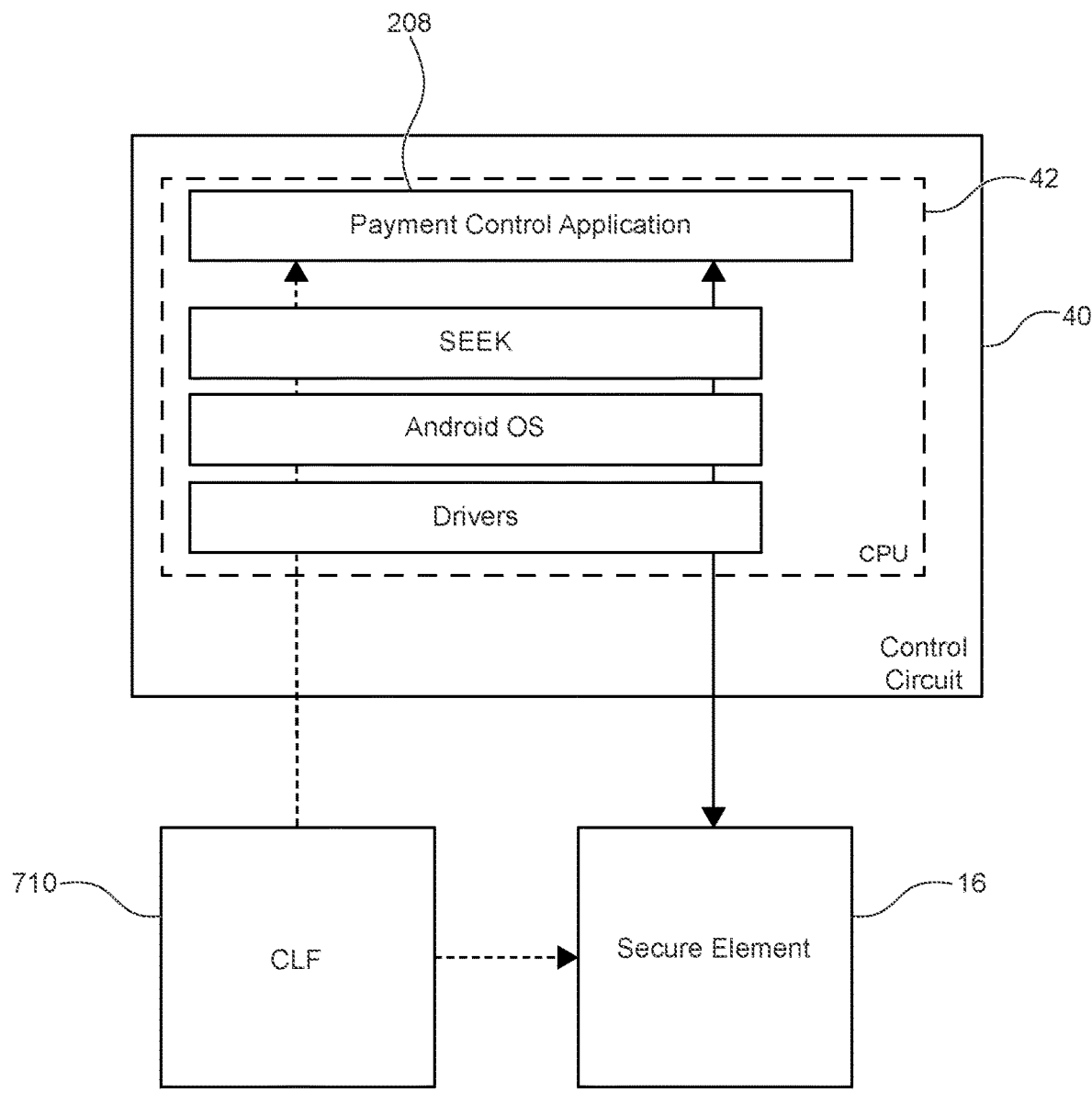
FIG. 7 is a diagrammatical representation of software stacks enabling a payment control application to communicate with software on a secure element in one embodiment of the present invention.

Now referring to FIG. 7, an illustration of software stacks enabling the payment control application 208 to communicate with software implementing the point of sale application 112 on the secure element 16 is illustrated. In one embodiment of the invention illustrated in FIG. 7, the payment control application 208 executed on the CPU 42 of the control circuit 40 communicates directly with the secure element 16, via the following software stacks: SEEK (Secure Element Evaluation Kit), operating system (e.g. Android OS), and low level drivers. SEEK is a software library for the Android OS than enables an Android application to communicate with a secured element, a SIM card, or a MicroSD card. The physical communication between the secure element 16 and the control circuit 40 is implemented via an ISO7816 link (not represented in FIG. 7). In another embodiment of the invention illustrated in FIG. 7, the payment control application 208 executed on the CPU 42 of the control circuit 40 communicates with the secure element 16 via a Contactless Front End (CLF) 710, using the same software stacks as in the previous embodiment. The physical communication between the CLF 710 and the control circuit 40 is implemented via an I2C link (not represented in FIG. 7).

Figure 13:
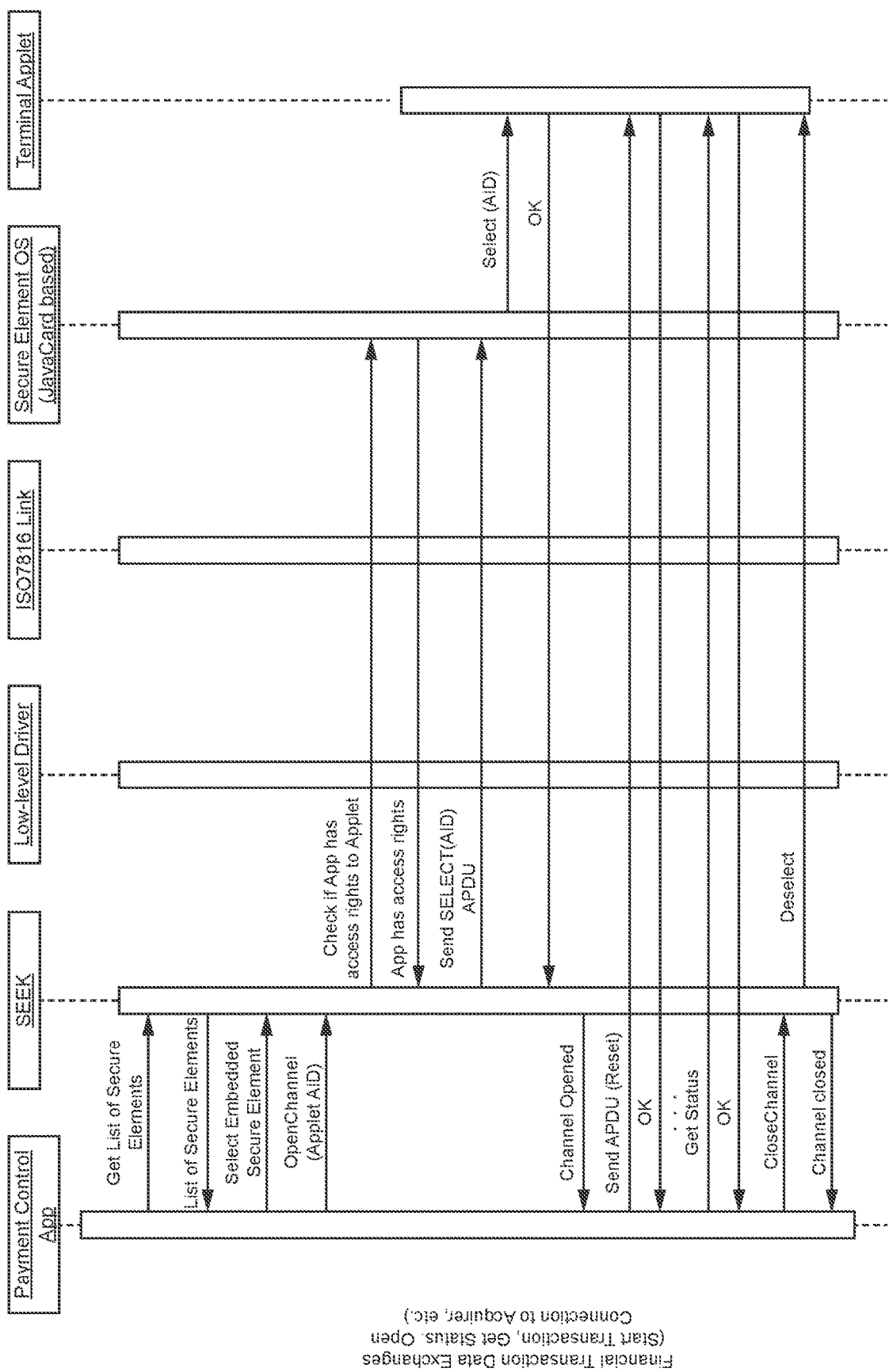
FIG. 13 is a flow chart depicting a payment control application communicating with software on a secure element in one embodiment of the present invention.

FIG. 13 is a flow chart illustrating the communications between the payment control application 208 and a terminal applet executed on the secure element 16 via the aforementioned software stacks. In the example illustrated in the flow chart, an ISO7816 link is used. Alternatively, the communications may go through the CLF 710.

Secure Element for Conducting a Secured Financial Transaction on a Device

Referring again to FIG. 5, the secure element 16 comprises a first module 200, a second module 202, and a third module EMV contact/contactless transaction module 204 and/or a third module MAG 206. Although it is made reference, in the present disclosure, to a module or modules, it should be understood that module may include for example, but without being limitative, computer program logic, computer program instructions, software, stack, firmware, hardware circuitry or a combination thereof which provides the required capabilities. The first module 200 comprises the drivers of the chipset on which the secure element 16 is running and provides access to the hardware layer of the secure element 16. The first module 200 is designed so as to be Level 1 certified for secured payment card data processing in accordance with the EMVCo Level 1 contact and contactless standard. Although reference to payment card data is made, it should be understood that any data, whether located on a payment card on any other supports (e.g. a mobile device embedding RFID functionalities for secured contactless payment processing) is also contemplated. The second module 202 comprises the operating system (OS) of the chipset implementing the secure element 16. In one embodiment of the present invention, the OS is Java Card® from Oracle Inc. In another embodiment of the present invention, the OS is compliant with the Global Platform standard. In still another embodiment of the present invention, the OS is a custom made OS, certified or not. In still another embodiment, no OS is running on top of the first module 200. In one embodiment of the present invention, the OS of the second module 202 is running on top of the first module 200 and is also Level 1 certified for secured payment card data processing in accordance with the EMVCo Level 1 contact and contactless standard.

The third module EMV contact/contactless transaction module 204 runs on top of the second module 202 and is designed to be Level 2 certified (optionally also Level 3 certified) in accordance with standards from major payment brands such as for example, but without being limitative, MasterCard®, Visa®, American Express®, JCB®, and Discover®. The third module EMV contact/contactless transaction module 204 comprises instructions to process the data read by the NFC interface 19 from payment cards and/or from RFID-enabled devices or by the smart card reader 55 from payment cards. In an embodiment of the present invention, the data read by the NFC interface 19, the smart card reader 55, or the magnetic strip reader 52 may be directly transmitted to the secure element 16 without passing through the control circuit 40. In an alternative embodiment of the present invention, the data read by the NFC interface 19 or the smart card reader 55 passes through the control circuit 40 before being transmitted to the secure element 16. The third module EMV contact/contactless transaction module 204 allows a secure processing of the data read in compliance with the EMV transaction standards. The data processed by the third module EMV contact/contactless transaction module 204 comprises data read from the NFC interface 19 or the smart card reader 55 but may also include information such as, for example, personal identification number (PIN), user signature, a passcode, user biometrics data or any data allowing a secure identification of the customer. Such information might be provided, through the I/O Controller 44, by the customer entering information from the keypad 48, the display 46 (e.g. through a touch-screen display), or any other interface allowing the customer to interact with the device 12. Although a third module EMV contact/contactless transaction module 204 embedding both contact transaction and contactless transaction capabilities is shown, it should be understood that the contact transaction and contactless transaction capabilities may be embedded in two different EMV modules without departing from the scope of the present invention. It should also be understood that the third module EMV contact/contactless transaction module 204 may embed additional capabilities such as, for example but without being limitative, processing of data read from a magnetic strip reader 52.

Alternatively, the secure element 16 may include, in addition to, or in replacement of, the third module EMV contact/contactless 203, a third module magnetic (MAG) 206. The third module MAG 206 runs on the OS provided by the second module 202 and is designed to be Level 2 certified (optionally also Level 3 certified) in accordance with standards from major payment brands such as for example, but without being limitative, MasterCard®, Visa®, American Express®, JCB®, and Discover®. The third module MAG 206 comprises instructions to process the data read by the magnetic strip reader 52 from payment cards. The third module MAG 206 allows a secure processing of the data read in compliance with the EMV transaction standards. The data processed by the third module MAG 206 comprises data read from the magnetic strip reader 52 but may also include information such as, for example, personal identification number (PIN), user signature, a passcode, user biometrics data or any data allowing a secure identification of a user. Such information might be provided, through the I/O Controller, by the user entering information from the keypad 48, the display 46 (e.g. through a touchscreen display), or any other interface allowing the customer to interact with the device 12.

The third module EMV contact/contactless transaction module 204 and the third module MAG 206 being embedded on the chipset implementing the secure element 16, this architecture allows fast processing of the data while enabling secured transactions to be conducted on the device 12 in compliance with the EMV transaction standards. In addition, in one embodiment of the present invention, this architecture allows the device 12 to have data solely processed by the secure element 16 independently of data processed by the CPU 42. In other words, the secure element 16 may process data that may not be accessed by the CPU 42 or the control circuit 40. In one embodiment of the present invention, this architecture allows the device 12 to obtain a transaction authorization from a financial institution based, at least partially, on data processed solely by the secure element 16 independently of data processed by the CPU 42 or the control circuit 40.

In still another embodiment of the present invention, only the secure element 16 accesses data read by the NFC interface 19 from payment cards or from RFID-enabled devices, data read by the smart card reader 55, and data read by the magnetic strip reader 52 from payment cards. As such, the payment control application 208 manages the transaction by interacting with the secure element 16 without having to access at least some of the sensitive data (e.g.

keys, certificates, and payment card numbers) that remains solely processed by and stored within a memory of the secure element 16. The secure element 16 being designed to be Level 2 certified (optionally also Level 3 certified) for secured payment card data processing in accordance with EMVCo standards and standards from major payment brands such as for example, but without being limitative, MasterCard®, Visa®, American Express®, JCB®, and Discover®, this provides a higher level of security by avoiding any applications running on the CPU 42 or on the control circuit 40 (for instance the payment control application 208) to access the data processed by and stored within the memory of the secure element 16. In addition, the secure element 16 is designed and preloaded on a separate chipset, so that the secure element 16 may be EMV transaction certified independently of the device 12. As such, in an embodiment of the present invention, the integration of the secure element 16 on a control circuit 40 allows the device 12 to be EMV transaction certified without having the other components of the device 12 to go through the EMV transaction certification process. In an alternative embodiment, the integration of the secure element 16 on a control circuit 40 still requires the device 12 to go through, at least partially, the EMV certification process to be EMV transaction certified. The secure element 16 may also be designed to be Level 3 certified for secured payment card data processing in accordance with standards from major payment brands such as for example, but without being limitative, MasterCard®, Visa®, American Express®, JCB®, and Discover®. Being Level 3 certified ensures secure data exchanges between software executed on the secure element 16 and a financial institution.

Figure 6:
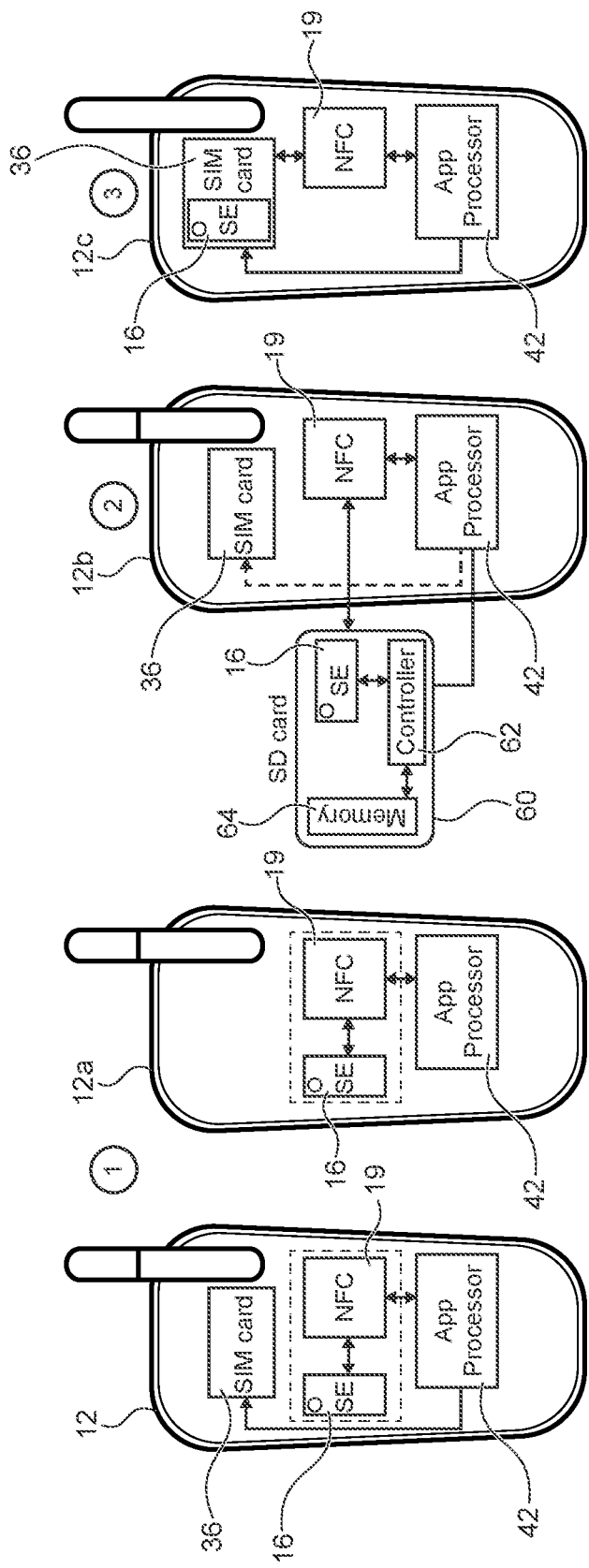
FIG. 6 is a diagrammatical representation of various architectures of devices embedding a secure element in accordance with various embodiments of the present invention.

FIG. 6 illustrates a schematic representation of the device 12 along with alternative embodiments of devices 12a, 12b, and 12c embedding the secure element 16. The representation of the devices 12a, 12b, and 12c illustrates, without being limitative, various locations of the secure element 16. The device 12a comprises a secure element 16, a NFC interface 19, a CPU 42 but does not include a SIM slot card and therefore does not include a SIM card, unique identification of the device user being provided by alternative circuitry or firmware/software embedded in the device 12a. The device 12b comprises a NFC interface 19, a CPU 42, a SIM card slot 36, and a secure digital (SD) card 60. Although a SD card 60 is shown, it should be understood that any non-volatile memory cards could be used without departing from the scope of the present invention. The SD card 60 comprises a controller 62 and a memory 64. As shown in FIG. 6, the secure element 16 is embedded on the SD card 60 which may be introduced in or removed from the device 12b. The architecture of the embodiment of the invention depicted in 12b allows the secure element 16 to be installed on a device that does not include any secure elements in its original circuitry thereby rendering the device 12b EMV contactless transaction enabled without having the device 12b being originally certified for EMV contactless transactions. The device 12c comprises a NFC interface 19, a CPU 42, and a SIM card slot 36. As shown, the secure element 16 is embedded in a SIM card located in the SIM card slot 36 which may be introduced in or removed from the device 12c. In an embodiment of the present invention, the SIM card located in the SIM card slot 36 is compliant with the Universal Subscriber Identity Module (USIM) standard. The architecture of the embodiment of the invention depicted in 12c allows the secure element 16 to be installed on a device that does not include any secure elements in its original circuitry thereby rendering the device 12c to be EMV contactless transaction enabled without having the device 12c being originally certified for EMV contactless transactions. In still an alternative embodiment not represented in FIG. 6, the secure element 16 may be located in a housing to be plugged to the device 12.

Figure 8A:
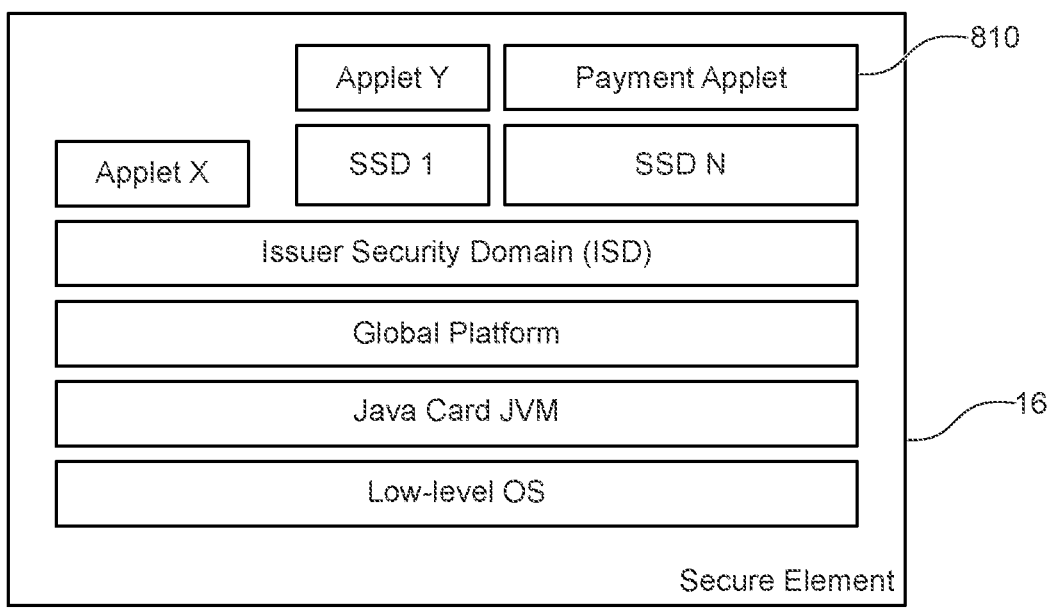
FIGS. 8a, 8b and 8c are diagrammatical representations of a software architecture of a secure element in various embodiments of the present invention.
Figure 8B:
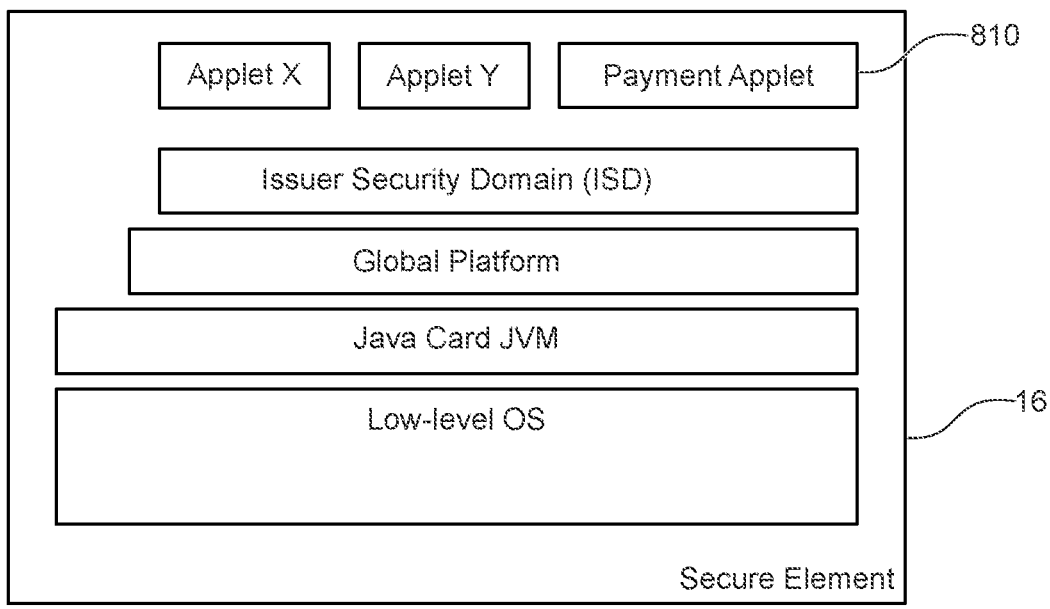

Reference is now made concurrently to FIG. 5, and to FIGS. 8a and 8b illustrating a software architecture of the secure element 16 providing security functionalities. The secure element 16 represented in FIGS. 8a and 8b includes a low-level OS, a Java Card Java Virtual Machine (JVM), and a Global Platform component, corresponding to the L1 certified drivers 200 and OS 202. The secure element 16 further comprises an Issuer Security Domain (ISD), and optional Supplementary Security Domains (SSD). On top of these components, java applets are executed in a secured environment. In particular, a payment applet 810 may implement the Level 2 certified (optionally also Level 3 certified) modules: EMV contact/contactless transaction module 204 and/or MAG module 206. Each Security Domain (SD) is isolated from one another. The owner of a Security Domain cannot access the data/programs residing in another Security Domain. Each Security Domain is secured by encryption keys and an authentication procedure. In order to access a specific Security Domain (add/modify/delete the applets residing in the specific Security Domain), the encryption keys protecting the specific Security Domain is used. The Issuer Security Domain (ISD) is under the control of the Issuer of the Secure Element 16 (a bank for a payment card, a cellular operator for a SIM card in a phone, or a phone manufacturer for an embedded secure element in a phone). The Issuer may create Supplementary Security Domains (SSD), for example to be used by a partner. The Issuer then transfers the encryption keys controlling this Supplementary Security Domain to the partner, who is granted access to the Supplementary Security Domain and may control what is loaded in this SSD. Furthermore, the ISD may place restrictions on the SSDs he creates (for instance, maximum footprint in the flash of the SSD). And, a hierarchy of Security Domains may be created, where the ISD contains zero, one, or more SSDs.

Figure 8C:
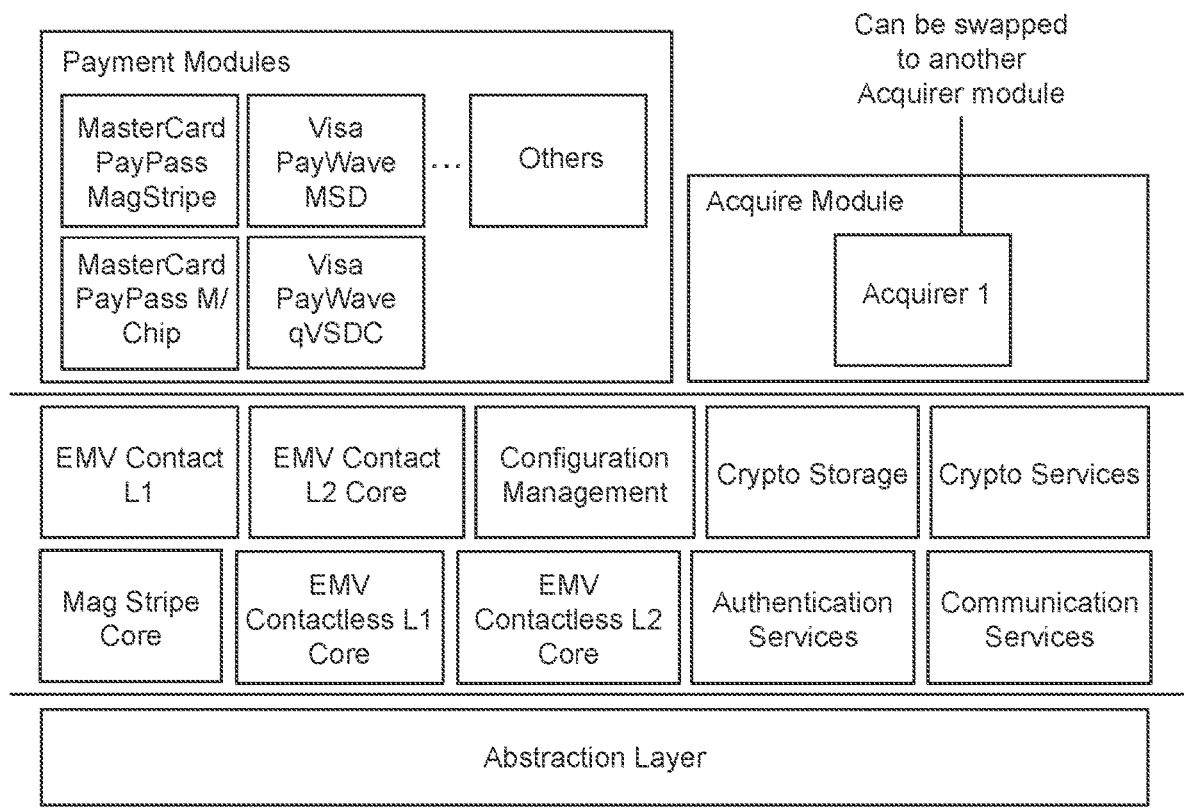

Reference is now made to FIG. 8c illustrating a software architecture of the payment applet 810 represented in FIGS. 8a and 8b. The payment applet 810 includes an abstraction layer, to interface generically with the lower level software components (e.g. the OS) of the secure element 16. The payment applet 810 includes interface modules, to interface with different contact and contactless interfaces of the device 12: EMV Contact L1 and EMV Contact L2 Core for interfacing with a smart card reader 55, EMV Contactless L1 core and EMV Contactless L2 Core for interfacing with a NFC interface 19, Mag Stripe Core for interfacing with a magnetic strip reader 52. The payment applet 810 comprises communication services, to communicate with external entities (e.g. a financial institution) via the communication interface 38 of the device 12. The payment applet 810 further comprises security services for securing a communication with the external entities (e.g. a financial institution): authentication services, cryptographic services, and crypto storage services. The payment applet 810 also includes an acquirer module. And the payment applet 810 includes several payment modules (e.g. MasterCard PayPass MagStripe, Visa PayWave MSD, MasterCard Paypass M/Chip, Visa PayWave qVSDC), to support various types of payment applications provided by different types of payment means (e.g. contact or contactless credit card, contactless payment enabled mobile phone, etc).

Figure 9A:
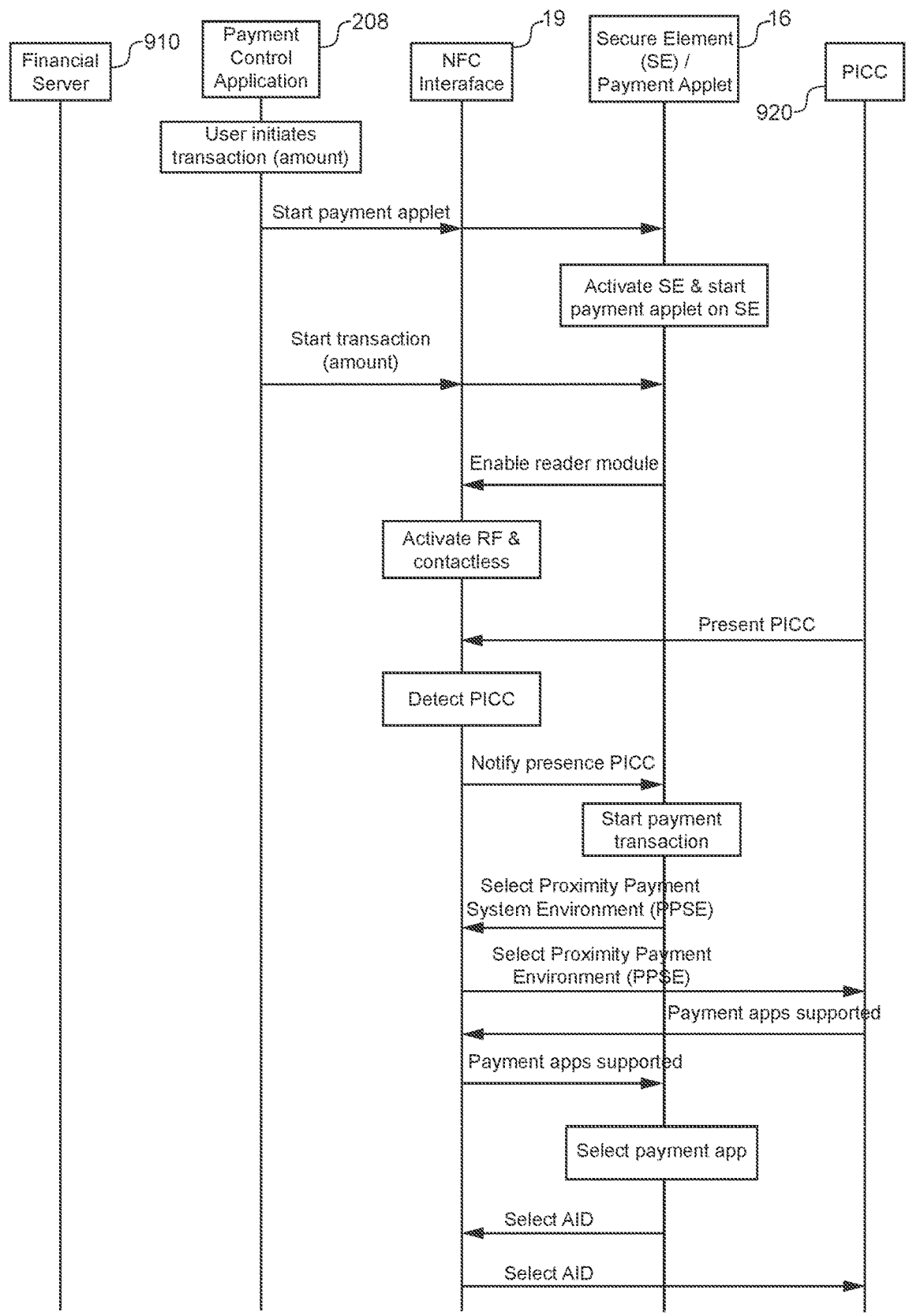
FIGS. 9a, 9b and 9c are a flowchart representation of a communication flow between a secure element and several other entities for conducting a secured financial transaction on a device in accordance with one embodiment of the present invention.
Figure 9B:
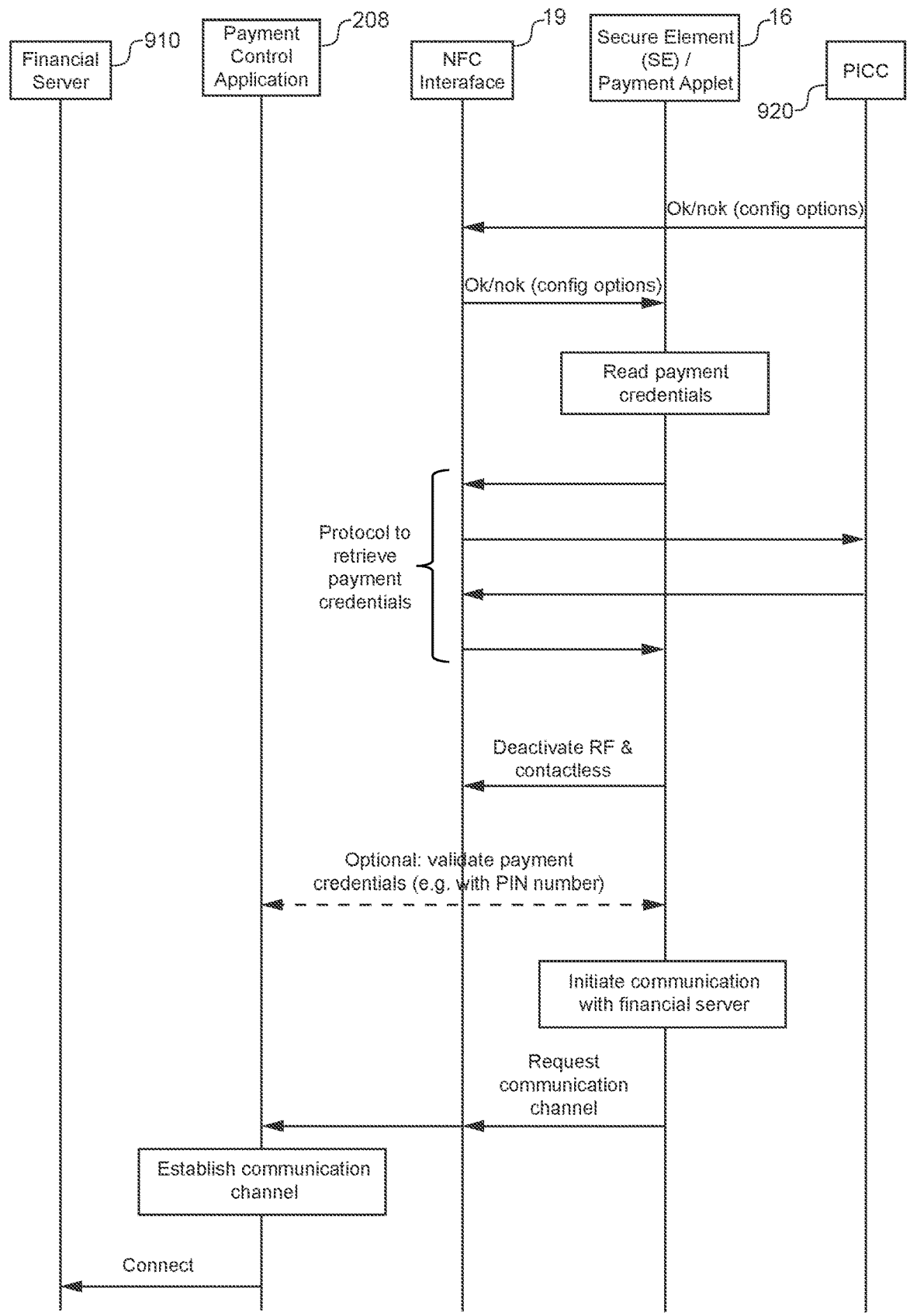
Figure 9C:
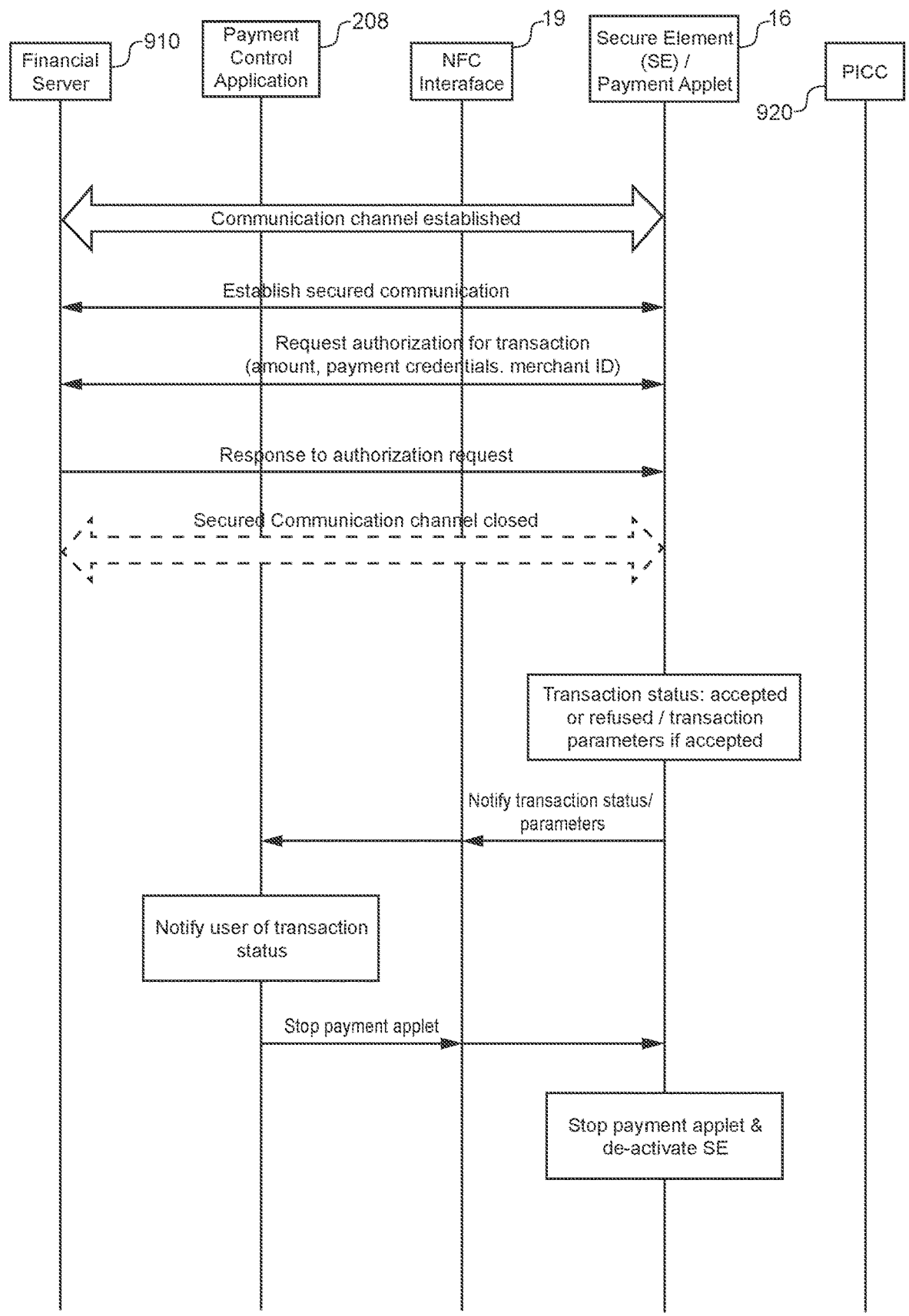

Execution of a Secured Financial Transaction by the Secure Element on the Device Reference is now concurrently made to FIGS. 1, 2, 4, 5, and to FIGS. 9a-c which are a flowchart representation of a communication flow between a secure element and several other entities for conducting a secured financial transaction on a device in accordance with the previously described embodiments of the present invention. Specifically, a financial server 910 of the financial institution 10 or of the payment card company 8 is represented. The payment control application 208 executed on the CPU 42 of the device 12 is represented. The NFC interface 19 is represented. The secure element 16 of the device 12 is represented (the payment applet 810 is executed on the secure element 16). And a Proximity Integrated Circuit Card (PICC) 920 is represented. The PICC 920 is integrated in a contactless enabled payment apparatus (such as the mobile phone 17 or credit card 13), and contains data relating to a financial account. The financial account is related to the financial institution 10 or to the payment card company 8.

In the embodiment illustrated in FIGS. 9a-c, the communications between the payment control application 208 and the secure element 16 are made through the NFC interface 19 (e.g. via a Contactless Front End CLF). Alternative embodiments may be applicable as well. For instance, the communications may be made through the control circuit 40.

Also, in the embodiment illustrated in FIGS. 9a-c, the interface 18 of the device 12 for reading the data relating to the financial account is the NFC interface 19 of the device 12. Alternatively, the interface may be a smart card reader 55 or a magnetic strip reader 52 of the device 12.

A user initiates a financial transaction via the payment control application 208, and an amount corresponding to the financial transaction is specified. The payment control application 208 sends a start payment applet message to the secure element 16 via the NFC interface 19. The secured element 16 is activated and the payment applet 810 is started on the secure element 16. The secure element 16 may acknowledge the launch of the payment applet 810 (not represented in FIGS. 9a-c). Then, the payment control application 208 sends a start transaction message (with the amount) to the secure element 16 via the NFC interface 19.

The secure element 16 sends a request to the NFC interface 19 to enable the reader mode of the NFC interface 19. The radio frequency (RF) and contactless functionalities of the NFC interface 19 are activated. The PICC 920 is advertising its presence and the NFC interface 19 detects the presence of the PICC 920. The NFC interface 19 notifies the presence of the PICC 920 to the secure element 16.

The secure element 16 starts a payment transaction with the detected PICC 920. A first step consists in sending (via the NFC interface 19) a Select Proximity Payment System Environment (PPSE) request to the PICC 920. The PICC 920 answers (via the NFC interface 19) to this request with a response indicating the payment applications supported by the PICC 920. The secure element 16 selects one of the payment applications among those available, and sends (via the NFC interface 19) a select Application Identifier (select AID) request to the PICC 920. The PICC 920 answers (via the NFC interface 19) to this request with a response indicating the status of the selection of the payment application (ok/nok), and configuration options related to the selected payment application.

A second step consists in reading payment credentials (e.g. key(s), certificate(s), payment card number) for the selected payment application from the PICC 920. A protocol exchange occurs between the secure element 16 and the PICC 920, via the NFC interface 19, to read the payment credentials. This protocol exchange is EMV compliant, in order to ensure a secure reading of the payment credentials. After this second step, the secure element 16 does not need to communicate with the PICC 920. Thus, the secure element 16 sends a request to the NFC interface 19 to deactivate the RF and contactless functionalities of the NFC interface 19.

An optional step consists in an exchange between the secure element 16 and the payment control application 208 (via the NFC interface 19) to validate the payment credentials. For example, the payment control application 208 may retrieve a PIN number associated to the PICC 920 (via an interaction of the owner of the PICC 920 with the display 46 and the keypad 48 of the device 12). The PIN number is transferred to the secure element 16 and used to validate the payment credentials.

A third step consists in initiating a communication with the financial server 910. The secure element 16 sends a request (via the NFC interface 19) to the payment control application 208 to establish a communication channel with the financial server 910. The payment control application 208 uses the networking resources of the device 12 to establish the communication channel between the secure element 16 and the financial server 910, via the communication interface 38 of the device. Then, the secure element 16 and the financial server 910 establish a secured communication over the communication channel; via for example the exchange of certificates, encryption keys, etc.

A fourth step consists in requesting an authorization from the financial institution. The secure element 16 sends a request to authorize the transaction to the financial server 910 over the secured communication channel. The authorization request includes several parameters used to authorize the transaction; for instance the amount, the payment credentials, a merchant ID (the merchant ID may be stored in the secure element 16 to identify the merchant using the point of sale application implemented by the device 12). The financial server 910 processes the authorization request, determines whether the financial transaction shall be authorized or nor, and sends a response to the authorization request over the secured communication channel. At this point, the secured communication channel is closed, since no more communication is needed between the secure element 16 and the financial server 910.

In a fifth step, the secure element 16 processes the response of the financial institution and determines the status of the financial transaction: accepted or refused. The secure element 16 further processes parameters that may have been transmitted by the financial server 910 along with the status of the transaction. For instance, the secure element 16 may generate a payment pictogram. Then, the secure element 16 transmits (via the NFC interface 19) a notification of the transaction status to the payment control application 208, along with parameters if any (for instance, the payment pictogram).

In a sixth step, the payment control application 208 notifies the user of the transaction status. And the payment control application 208 sends (via the NFC interface 19) a stop payment applet message to the secure element 16. The payment applet 810 is stopped on the secure element 16 and the secured element 16 is deactivated.

Figure 10:
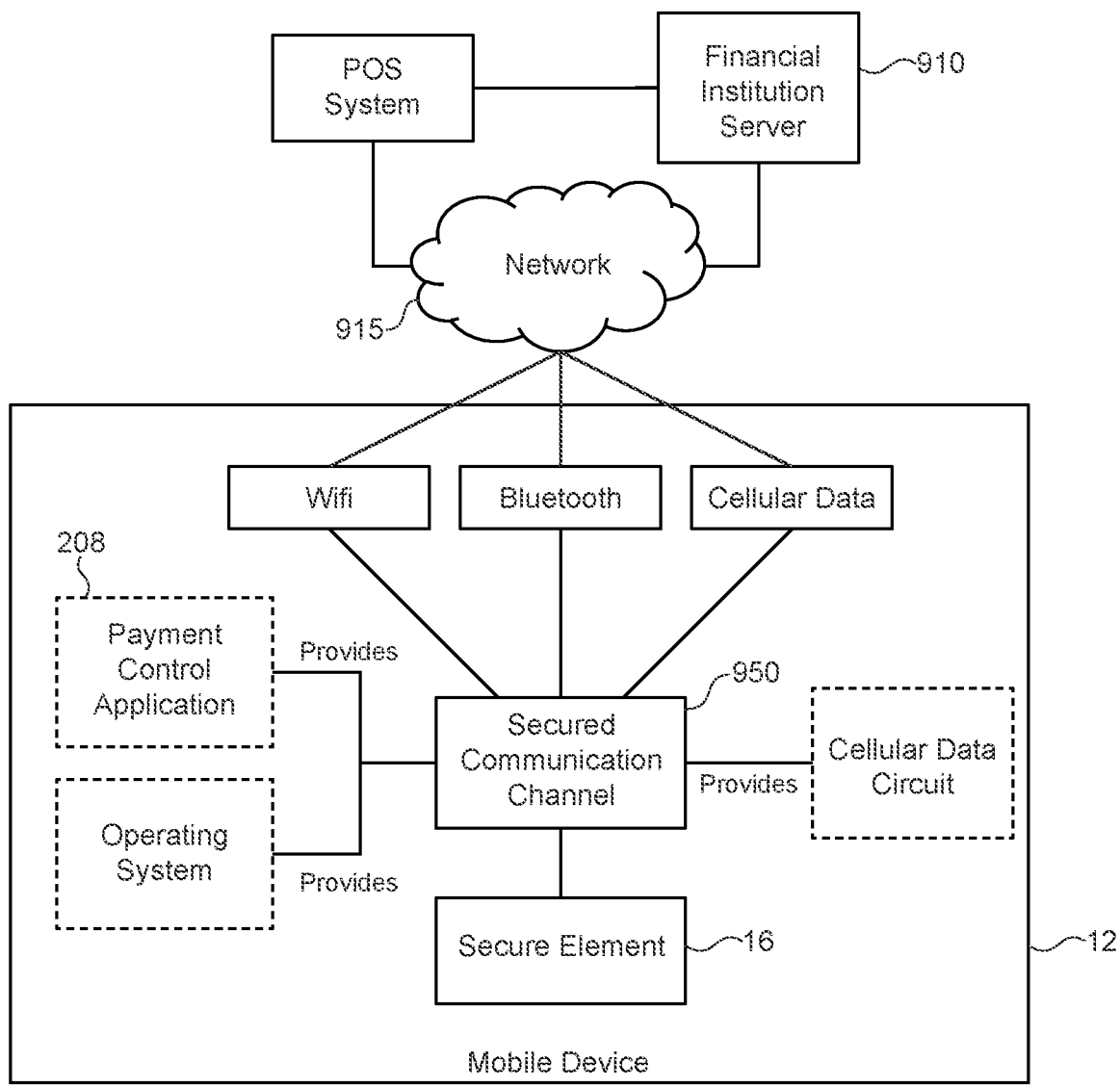
FIG. 10 is a diagrammatical representation of a secured communication channel between a secure element and a financial institution.

Reference is now made to FIG. 10, which is a diagrammatical representation of a secured communication channel between a secure element and a financial institution. The secured communication channel 950 is established between the secure element 16 of the mobile device 12 and the financial institution server 910, and illustrates the secured communication channel described previously in relation to FIGS. 9a-c. The secured communication channel 950 is established by various entities of the mobile device 12, including for example the payment control application 208, and the operating system of the CPU (not represented in FIG. 10) of the mobile device 12. The secured communication channel 950 is established via one of the communication interfaces supported by the mobile device 12. For illustration purposes, three communication interfaces are represented in FIG. 10 (wifi, bluetooth, and cellular data); and the cellular data interface is used for the establishment of the communication channel 950. The secured communication channel 950 is established over a generally non secured network 915 (a cellular data network in the present illustration), between the mobile device 12 and the financial institution server 910. The secured communication channel 950 is initially a non-secured, or partially secured, communication channel. The securitization (as illustrated in FIGS. 9a-c) is performed in a second phase by the secured element 16 and the financial institution server 910 (via for example the exchange and usage of encryption keys, certificates, etc), to implement the appropriate level of security required for performing a secured financial transaction over the secured communication channel 950.

Figure 11:
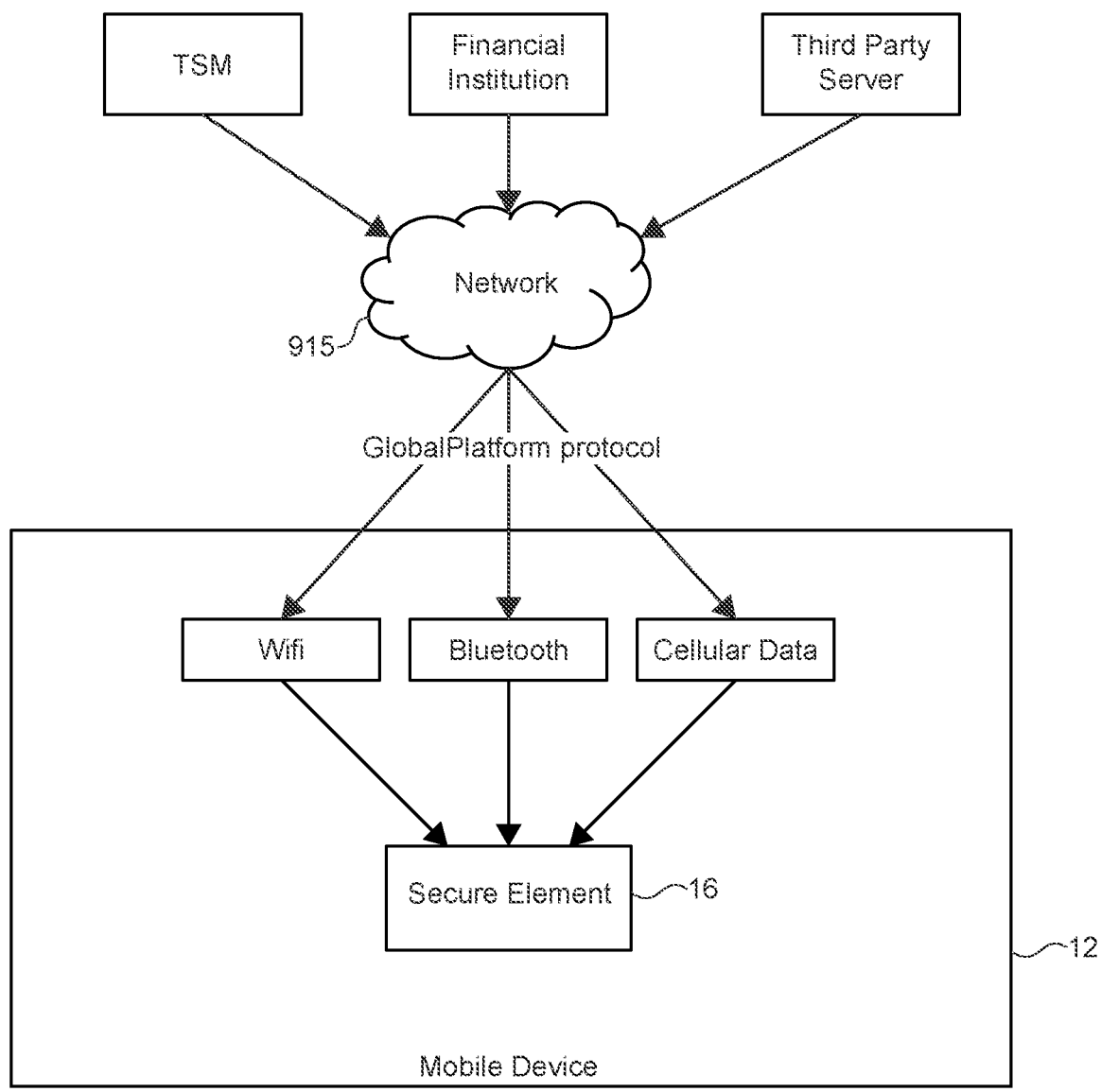
FIG. 11 is a diagrammatical representation of a payment software loading, updating and configuration process in a secure element in accordance with one embodiment of the present invention.

Secure Download, Configuration and Upgrade of the Payment Software on the Secure Element Reference is now made to FIG. 11, which is a diagrammatical representation of a payment software loading, updating and configuration process in a secure element in accordance with one embodiment of the present invention. The secure element 16 of the mobile device 12 may communicate with several entities, in order to load, update, and configure the payment software (e.g. the payment applet 810 represented in FIG. 8c) executed by the secure element 16. Such entities include a Trusted Service Manager (TSM), a financial institution, and a third party server.

The Trusted Service Manager (TSM) is a third-party managing a Security Domain (ISD or SSD) for a client in a secure element (e.g SIM card, embedded secure element, MicroSD card). The TSM has a proper infrastructure to securely store and use the encryption keys to access the Security Domains, to store the software and data, and to remotely access the secure elements. The TSM enables a trusted and remote deployment of software and data on the secure element 16 without having physical access to the device 12. Instead of the TSM, a financial institution server or a third party server may be used, to manage the secure storage and the secure deployment of the software and data to be loaded in the secure element 16. In particular, a third party server is essentially similar to a TSM in terms of functionalities, but may not have all the security restrictions and liabilities associated with a full-blown TSM. In a first step, a communication channel is opened between the payment control application 208 executed on the device 12, and the TSM/financial institution server/third party server. In a second step, the TSM/financial institution server/third party server opens a secure communication channel with the secure element 16 on the device 12, interfaces with the appropriate Security Domain on the secure element 16, and securely loads the software and data on the secure element 16.

The load/update/configure processes are performed via a generally non-secured network 915 (e.g. a cellular data network), using one of the communication interfaces (e.g. wifi, bluetooth, or cellular data) of the mobile device 12. Thus, the load/update/configure processes need to be secured, as will be further illustrated in relation to FIG. 12. The load/update/configure processes are generally performed in accordance with a specific (secured) protocol, for instance the GlobalPlatform protocol.

In an alternative embodiment (not represented in FIG. 11), instead of using a communication network 915, a MicroSD card containing the software and data to be uploaded in the secure element 12 may be used.

Figure 12:
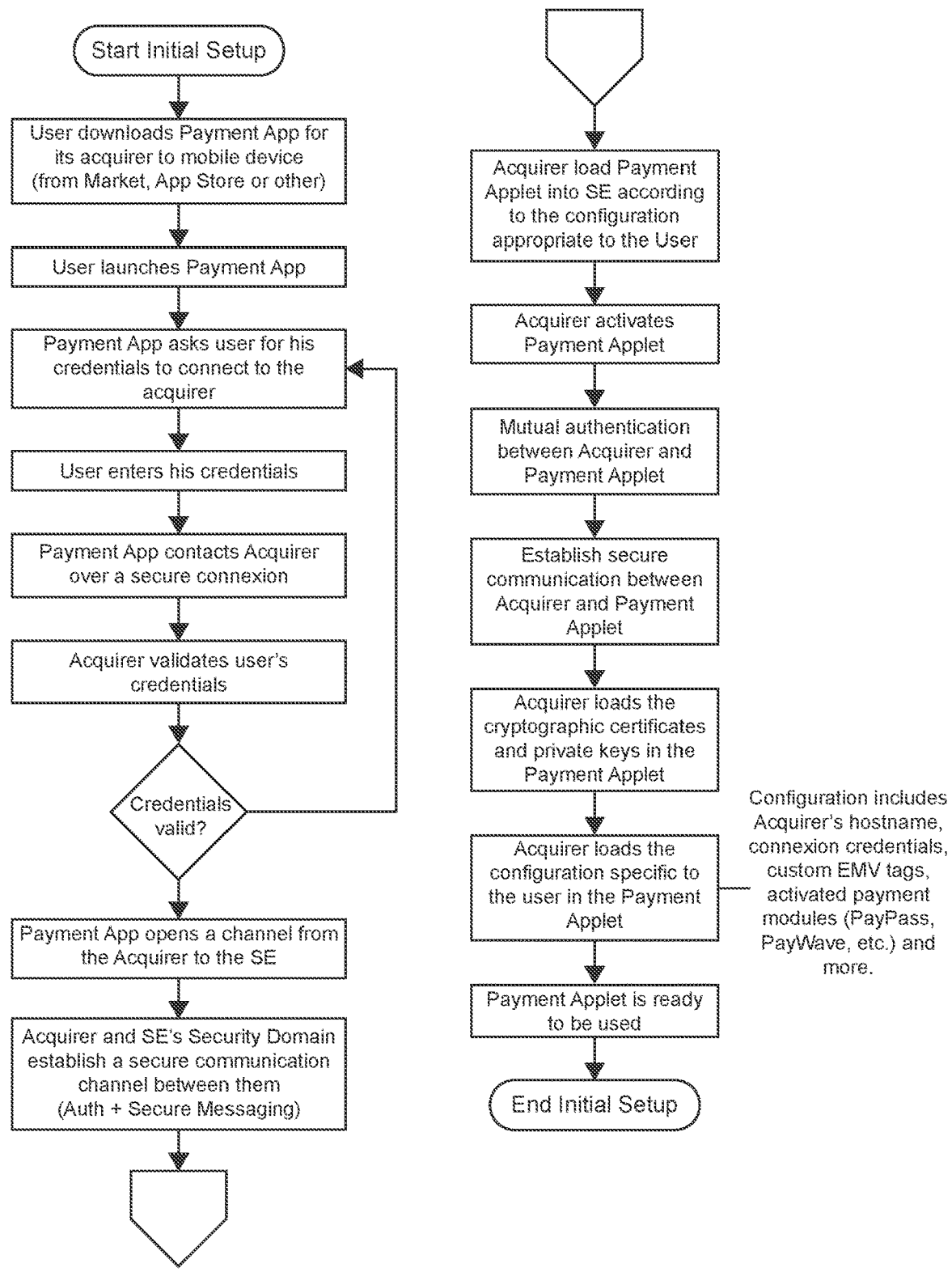
FIG. 12 is a flow chart depicting a payment software loading, updating and configuration process in a secure element in accordance with one embodiment of the present invention.

Reference is now made to FIG. 12, which is a flow chart depicting a payment software loading, updating and configuration process in a secure element in accordance with one embodiment of the present invention. The flow chart illustrates the comprehensive installation of all the necessary software and data on a mobile device embedding a secure element, in order to implement a point of sale application.

In a first step, a user of the mobile device downloads a Payment Application for its Acquirer (e.g. the TSM, the financial institution server, or the third party server represented in FIG. 12) to the mobile device (for example from a market, an application store, etc). The user launches the Payment Application, which is executed by the CPU of the mobile device. The Payment Application requests the user to enter its credentials in order to contact the Acquirer. The user enters its credentials. The payment application contacts the Acquirer over a secure connection. The Acquirer validates the user's credentials. If the credentials are not valid, the user is requested by the Payment Application to re-enter its credentials.

In a second step (once the credentials have been validated), the Payment Application opens a communication channel between the Acquirer and the secure element. The procedure to open this communication channel is similar to the one described with respect to FIG. 10. The Acquirer and the Security Domain of the secure element further establish a secured communication over the communication channel, providing authentication and secure messaging between them.

In a third step, the Acquirer loads a specific payment applet in the secure element, the specific payment applet being selected according to an appropriate configuration for the user of the (point of sale enabled) mobile device. Then, the Acquirer activates the payment applet.

In a fourth step, a mutual authentication is performed between the Acquirer and the payment applet; and a secured communication is established between them (over the secured communication channel already established between the Acquirer and the secure element). Then, the Acquirer loads cryptographic certificates and private keys in the payment applet. And the Acquirer loads configuration data specific to the user of the (point of sale enabled) mobile device in the payment applet. The configuration data may include the Acquirer's hostname, connection credentials, custom EMV tags, activated payment modules (e.g. PayPass, PayWave), country codes and currencies, etc. The payment applet is now ready to be used.

An update of the payment applet may be performed according to the previously described second, third, and fourth steps.

While the above-described embodiments of the present invention have been described and shown with reference to particular steps performed in a particular order, it will be understood that these steps may be combined, sub-divided, or re-ordered without departing from the teachings of the present invention. Accordingly, the order and grouping of the steps is not a limitation of the present invention.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A secure element for installation in a device used as a payment terminal, the device running a point of sale (POS) application, the POS application comprising a payment control application, the payment control application comprising control instructions to control the secure element, the device comprising a processor, a contactless interface and a communication interface, the secure element comprising instructions accessed from a non-transitory computer readable storage medium to cause the secure element, upon executing the instructions, to run:
   an Europay, MasterCard, and Visa (EMV) transaction module that is configured to process data acquired by the contactless interface of the device from a payment apparatus, the contactless interface being configured to receive data wirelessly from the payment apparatus;
   an operating system (OS) configured to process data provided by the EMV transaction module;
wherein the EMV transaction module is configured to execute:
   a reception of a request to conduct a secured financial transaction for receiving a payment;
   an acquisition, by the secure element, via the contactless interface of the device, and from the payment apparatus, of data relating to a financial account, the acquisition comprising (i) a sending, via the contactless interface, of a Select Proximity Payment System Environment (PPSE) request to the payment apparatus, (ii) a receiving, via the contactless interface, of a response from the payment apparatus indicating payment applications supported by the payment apparatus and (iii) a selection of a payment application amongst those available;
   an establishment of a secured communication channel with a server through the communication interface of the device;
   a sending over the secured communication channel to the server of an authorization request to perform the secured financial transaction, the authorization request comprising at least a portion of the data relating to the financial account;
   a reception over the secured communication channel from the server of a response to the authorization request; and
   a processing of the response to the authorization request to generate a status of the secured financial transaction.

2. The secure element of claim 1, wherein the establishment of the secured communication channel comprises a sending, by the secure element, of a request to establish the secured communication channel by the payment control application and wherein the request to conduct a secured financial transaction is transmitted by the payment control application running on the processor of the device.

3. The secure element of claim 1, wherein the data relating to the financial account are being processed by the secure element independently of data processed by the processor of the device.

4. The secure element of claim 1, wherein the EMV transaction module is further configured to execute a sending, by the secure element, to the payment control application running on the processor of the device of the status of the secured financial transaction.

5. The secure element of claim 1, wherein the control instructions to control the secure element comprises instructions to cause the sending, by the payment control application to the secure element, of a start payment applet message to the secure element and an activation of the secure element based on the start payment applet message.

6. The secure element of claim 1, wherein the secure element is embedded in one of a chipset embedded on a circuitry of the device, a subscriber identity module (SIM) card, a secure digital (SD) card, a non-volatile memory card, and a housing to be plugged to the device.

7. The secure element of claim 1, wherein the EMV transaction module is a contactless transaction module.

8. The secure element of claim 1, wherein the request to conduct the secured financial transaction comprises a purchase amount to be debited from the financial account.

9. The secure element of claim 1, wherein the payment apparatus is one of a payment card and a mobile device.

10. The secure element of claim 1, wherein the data relating to the financial account include at least one of a key, a certificate, and a payment card number.

11. A non-transitory computer readable storage medium comprising computer-executable instructions for execution by a secure element of a device used as a payment terminal, the device running a point of sale (POS) application, the POS application comprising a payment control application, the payment control application comprising control instructions to control the secure element, the computer-executable instructions, upon execution by a processor, causing the secure element to run:
   an Europay, MasterCard, and Visa (EMV) transaction module that is configured to process data acquired by a contactless interface of the device from a payment apparatus, the contactless interface being configured to receive data wirelessly from the payment apparatus;
   an operating system (OS) configured to process data provided by the EMV transaction module;
wherein the EMV transaction module is configured to execute:
   a reception of a request to conduct a secured financial transaction for receiving a payment;
   an acquisition, by the secure element, via the contactless interface of the device, and from the payment apparatus, of data relating to a financial account, the acquisition comprising (i) a sending, via the contactless interface, of a Select Proximity Payment System Environment (PPSE) request to the payment apparatus, (ii) a receiving, via the contactless interface, of a response from the payment apparatus indicating payment applications supported by the payment apparatus and (iii) a selection of a payment application amongst those available;
   an establishment of a secured communication channel with a server through a communication interface of the device;
   a sending over the secured communication channel to the server of an authorization request to perform the secured financial transaction, the authorization request comprising at least a portion of the data relating to the financial account;
   a reception over the secured communication channel from the server of a response to the authorization request; and
   a processing of the response to the authorization request to generate a status of the secured financial transaction.

12. The non-transitory computer readable storage medium of claim 11, wherein the establishment of the secured communication channel comprises a sending, by the secure element, of a request to establish the secured communication channel by the payment control application and wherein the request to conduct a secured financial transaction is transmitted by the payment control application running on the processor of the device.

13. A device, the device comprising a processor, a non-transitory computer readable storage medium and a secure element, the device running a point of sale (POS) application, the POS application comprising a payment control application, the payment control application comprising control instructions to control the secure element, the non-transitory computer readable storage medium comprising computer-executable instructions for execution by the secure element, the computer-executable instructions, upon execution by the secure element, causing the secure element to run:
- an Europay, MasterCard, and Visa (EMV) transaction module that is configured to process data acquired by a contactless interface of the device from a payment apparatus, the contactless interface being configured to receive data wirelessly from the payment apparatus;
- an operating system (OS) configured to process data provided by the EMV transaction module;

wherein the EMV transaction module is configured to execute:
- a reception of a request to conduct a secured financial transaction for receiving a payment;
- an acquisition, by the secure element, via the contactless interface of the device, and from the payment apparatus, of data relating to a financial account from the payment apparatus, the acquisition comprising (i) a sending, via the contactless interface, of a Select Proximity Payment System Environment (PPSE) request to the payment apparatus, (ii) a receiving, via the contactless interface, of a response from the payment apparatus indicating payment applications supported by the payment apparatus and (iii) a selection of a payment application amongst those available;
- an establishment of a secured communication channel with a server through a communication interface of the device;
- a sending over the secured communication channel to the server of an authorization request to perform the secured financial transaction, the authorization request comprising at least a portion of the data relating to the financial account;
- a reception over the secured communication channel from the server of a response to the authorization request; and
- a processing of the response to the authorization request to generate a status of the secured financial transaction.

14. The secure element of claim 13, wherein the establishment of the secured communication channel comprises a sending, by the secure element, of a request to establish the secured communication channel by the payment control application and wherein the request to conduct a secured financial transaction is transmitted by the payment control application running on the processor of the device.

15. The device of claim 13, wherein the secure element is one of a processing entity characterized by specific hardware, a processing entity characterized by software embedding secured components and a processing entity characterized by firmware embedding secured components.

16. The device of claim 13, wherein the data relating to the financial account are being processed by the secure element independently of data processed by the processor of the device.

17. The device of claim 13, wherein the EMV transaction module is further configured to execute a sending, by the secure element, to the payment control application running on the processor of the device of the status of the secured financial transaction.

18. The device of claim 13, wherein the control instructions to control the secure element comprises instructions to cause the sending, by the payment control application to the secure element, of a start payment applet message to the secure element and an activation of the secure element based on the start payment applet message.

19. The device of claim 13, wherein the secure element is characterized by software components operating a secured environment.

* * * * *